US012526075B2

(12) United States Patent
Akkarakaran et al.

(10) Patent No.: US 12,526,075 B2
(45) Date of Patent: Jan. 13, 2026

(54) DELAY PARAMETER DETERMINATION FOR CONTROL MESSAGE REPETITION

(71) Applicant: QUALCOMM Incorporated, San Diego, CA (US)

(72) Inventors: Sony Akkarakaran, Poway, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 873 days.

(21) Appl. No.: 17/320,080

(22) Filed: May 13, 2021

(65) Prior Publication Data

US 2021/0359789 A1    Nov. 18, 2021

Related U.S. Application Data

(60) Provisional application No. 63/025,166, filed on May 14, 2020.

(51) Int. Cl.
*H04L 1/08*    (2006.01)
*H04W 52/02*    (2009.01)
(Continued)

(52) U.S. Cl.
CPC .......... *H04L 1/08* (2013.01); *H04W 52/0225* (2013.01); *H04W 72/0446* (2013.01); *H04W 72/20* (2023.01)

(58) Field of Classification Search
USPC ..... 370/229, 230.1, 235, 252, 328, 329, 330
See application file for complete search history.

(56) References Cited

U.S. PATENT DOCUMENTS

2019/0289478 A1*  9/2019  Hosseini ................. H04L 1/187
2019/0342030 A1   11/2019  Hosseini et al.
(Continued)

FOREIGN PATENT DOCUMENTS

CN    111149411 A    5/2020
EP    3852436 A1    7/2021
(Continued)

OTHER PUBLICATIONS

Samsung, 'On Beam Management, Measurement and Reporting', R1-1720290, 3GPP TSG RAN WG1 Meeting 91, Dec. 1, 2017, (Year: 2017).*
(Continued)

*Primary Examiner* — Nguyen H Ngo
(74) *Attorney, Agent, or Firm* — Holland & Hart LLP

(57) ABSTRACT

Methods, systems, and devices for wireless communications are described. A user equipment (UE) may receive, from a base station, a configuration message indicating that transmission of a control message is to be repeated via a set of control message repetitions. The UE may identify that a repetition instance of the set of control message repetitions is designated as a triggering instance for a delay parameter, where the delay parameter corresponds to a time delay between the triggering instance and an operation associated with the control message. The UE may then receive, from the base station, the triggering instance during a first transmission time interval and perform the operation during a second transmission time interval that is after the first transmission time interval by at least the time delay.

30 Claims, 15 Drawing Sheets

(51) Int. Cl.
   *H04W 72/0446*   (2023.01)
   *H04W 72/20*     (2023.01)

(56) References Cited

U.S. PATENT DOCUMENTS

| | | | |
|---|---|---|---|
| 2022/0287071 A1* | 9/2022 | Seo | H04W 72/23 |
| 2023/0028843 A1* | 1/2023 | Sun | H04B 7/0626 |
| 2024/0031067 A1* | 1/2024 | Gao | H04L 1/1671 |

FOREIGN PATENT DOCUMENTS

| | | | |
|---|---|---|---|
| WO | WO-2017081490 A1 | 5/2017 | |
| WO | WO-2020054036 A1 | 3/2020 | |
| WO | WO-2020060890 A1 | 3/2020 | |

OTHER PUBLICATIONS

International Search Report and Written Opinion—PCT/US2021/032472—ISA/EPO—Sep. 15, 2021.

* cited by examiner

DELAY PARAMETER DETERMINATION FOR CONTROL MESSAGE REPETITION

CROSS REFERENCE

The present application for patent claims the benefit of U.S. Provisional Patent Application No. 63/025,166 by AKKARAKARAN et al., entitled "DELAY PARAMETER DETERMINATION FOR CONTROL MESSAGE REPETITION," filed May 14, 2020, assigned to the assignee hereof, and expressly incorporated by reference herein.

FIELD OF TECHNOLOGY

The following relates generally to wireless communications and more specifically to delay parameter determination for control message repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may implement control messages (e.g., physical downlink control channel messages transmitted by a base station) to grant upcoming resources for data transmissions (e.g., where the data transmissions are sent over a physical downlink shared channel). Additionally, UEs, may perform one or more operations based on a timing associated with the control channel. Some wireless communications systems may experience relatively poor performance. For example, a UE may fail to accurately identify a transmission from a base station over a control channel, which may result in relatively inefficient communications.

SUMMARY

The described techniques relate to improved methods, systems, devices, and apparatuses that support delay parameter determination for control message repetition. Generally, the described techniques provide for physical downlink control channel repetition to improve control channel reliability while maintaining low latency (e.g., for ultra-reliable low-latency communications systems). For example, a base station may transmit an initial control message indicating resources for a data transmission (e.g., a physical downlink shared channel transmission). In some cases, the base station may transmit multiple repetitions (or copies) of the initial control message (physical downlink control channel) to enable a UE to combine multiple repetitions of the physical downlink control channel and decode the physical downlink control channel.

The described techniques provide for a base station to a indicate to a user equipment (UE) a particular instance of a physical downlink control channel (e.g., the first copy of the physical downlink control channel, the last copy of the physical downlink control channel, etc.) for the UE to consider as a triggering instance. The triggering instance, as indicated by the base station, may be the repetition to be used by the UE to calculate various timing events. Additionally, the UE may be configured to determine one or more scheduling delays based not only on a specific triggering instance of the physical downlink control channel, but also a specific temporal part of the physical downlink control channel triggering instance.

A method of wireless communication at a UE is described. The method may include receiving a configuration message indicating that transmission of a control message is to be repeated via a set of control message repetitions, identifying that a repetition instance of the set of control message repetitions is designated as a triggering instance for a minimum delay parameter, where the minimum delay parameter corresponds to a minimum time delay between the triggering instance and receipt of a data message scheduled by the control message, receiving the triggering instance during a first transmission time interval, and monitoring for the data message during a second transmission time interval that is at least the minimum time delay after receipt of the triggering instance.

An apparatus for wireless communication is described. The apparatus may include a processor, memory coupled with the processor, and instructions stored in the memory. The instructions may be executable by the processor to cause the apparatus to receive a configuration message indicating that transmission of a control message is to be repeated via a set of control message repetitions, identify that a repetition instance of the set of control message repetitions is designated as a triggering instance for a minimum delay parameter, where the minimum delay parameter corresponds to a minimum time delay between the triggering instance and receipt of a data message scheduled by the control message, receive the triggering instance during a first transmission time interval, and monitor for the data message during a second transmission time interval that is at least the minimum time delay after receipt of the triggering instance.

Another apparatus for wireless communication at a UE is described. The apparatus may include means for receiving a configuration message indicating that transmission of a control message is to be repeated via a set of control message repetitions, identifying that a repetition instance of the set of control message repetitions is designated as a triggering instance for a minimum delay parameter, where the minimum delay parameter corresponds to a minimum time delay between the triggering instance and receipt of a data message scheduled by the control message, receiving the triggering instance during a first transmission time interval, and monitoring for the data message during a second transmission time interval that is at least the minimum time delay after receipt of the triggering instance.

A non-transitory computer-readable medium storing code for wireless communication at a UE is described. The code may include instructions executable by a processor to receive a configuration message indicating that transmission of a control message is to be repeated via a set of control message repetitions, identify that a repetition instance of the set of control message repetitions is designated as a triggering instance for a minimum delay parameter, where the minimum delay parameter corresponds to a minimum time delay between the triggering instance and receipt of a data message scheduled by the control message, receive the triggering instance during a first transmission time interval, and monitor for the data message during a second transmission time interval that is at least the minimum time delay after receipt of the triggering instance.

In some examples of the method, apparatuses, and non-transitory computer-readable medium described herein, the triggering instance includes a first repetition of the control message or a last repetition of the control message.

In some examples of the method, apparatuses, and non-transitory computer-readable medium described herein, the triggering instance includes a repetition of the control message included in a subset of a set of configured repetitions of the control message, where the set of configured repetitions of the control message includes a maximum number of repetitions supported by the UE.

Some examples of the method, apparatuses, and non-transitory computer-readable medium described herein may further include operations, features, means, or instructions for receiving a parameter associated with the triggering instance, and calculating the minimum time delay based on the identified parameter associated with the triggering instance.

In some examples of the method, apparatuses, and non-transitory computer-readable medium described herein, the parameter associated with the triggering instance includes at least one of a starting symbol of the control message, an ending symbol of the control message, a duration of the control message, or a combination thereof.

In some examples of the method, apparatuses, and non-transitory computer-readable medium described herein, the starting symbol of the control message corresponds to a start of the first transmission time interval and the ending symbol of the control message corresponds to an end of the first transmission time interval.

In some examples of the method, apparatuses, and non-transitory computer-readable medium described herein, the starting symbol of the control message and the ending symbol of the control message each correspond to specific symbols of the first transmission time interval, where the specific symbols may be either predetermined or may be indicated to the UE by a base station.

In some examples of the method, apparatuses, and non-transitory computer-readable medium described herein, the parameter may be constant across a set of repetition instances designated as triggering instances.

Some examples of the method, apparatuses, and non-transitory computer-readable medium described herein may further include operations, features, means, or instructions for receiving an indication to drop a repetition instance, determining that the repetition instance to be dropped corresponds to the repetition instance designated as the triggering instance, and dropping the repetition instance based on receiving the indication.

Some examples of the method, apparatuses, and non-transitory computer-readable medium described herein may further include operations, features, means, or instructions for designating a subsequent repetition instance as the triggering instance based on dropping the repetition instance.

Some examples of the method, apparatuses, and non-transitory computer-readable medium described herein may further include operations, features, means, or instructions for initiating a sleep mode after receiving the triggering instance of the control message, and terminating the sleep mode upon expiration of the minimum time delay between the first transmission time interval and the second transmission time interval.

Some examples of the method, apparatuses, and non-transitory computer-readable medium described herein may further include operations, features, means, or instructions for transmitting, to a base station, a capability of the UE to support a set of minimum delay parameters, and receiving, from the base station, an indication of the minimum delay parameter based on the capability of the UE.

In some examples of the method, apparatuses, and non-transitory computer-readable medium described herein, receiving the indication of the minimum delay parameter further may include operations, features, means, or instructions for receiving, from the base station, the indication of the minimum delay parameter via a radio resource control message.

In some examples of the method, apparatuses, and non-transitory computer-readable medium described herein, identifying that the repetition instance of the set of control message repetitions may be designated as the triggering instance further may include operations, features, means, or instructions for receiving, from a base station, an indication of that the repetition instance of the set of control message repetitions may be designated as the triggering instance via at least one of a master information block, a system information block, a radio resource control message, a medium access control (MAC) control element, a downlink control information, or a combination thereof.

In some examples of the method, apparatuses, and non-transitory computer-readable medium described herein, a value of the minimum delay parameter may be based on repetition instance designated as the triggering instance.

In some examples of the method, apparatuses, and non-transitory computer-readable medium described herein, the control message includes at least one of a physical downlink control channel, a physical sidelink control channel, or a combination thereof.

A method of wireless communication at a UE is described. The method may include receiving, from a base station, a configuration message indicating that transmission of a control message is to be repeated via a set of control message repetitions, identifying that a repetition instance of the set of control message repetitions is designated as a triggering instance for a delay parameter, where the delay parameter corresponds to a time delay between the triggering instance and an operation associated with the control message, receiving, from the base station, the triggering instance during a first transmission time interval, and performing the operation during a second transmission time interval that is after the first transmission time interval by at least the time delay.

An apparatus for wireless communication is described. The apparatus may include a processor, memory coupled with the processor, and instructions stored in the memory. The instructions may be executable by the processor to cause the apparatus to receive, from a base station, a configuration message indicating that transmission of a control message is to be repeated via a set of control message repetitions, identify that a repetition instance of the set of control message repetitions is designated as a triggering instance for a delay parameter, where the delay parameter corresponds to a time delay between the triggering instance and an operation associated with the control message, receive, from the base station, the triggering instance during a first transmission time interval, and perform the operation during a second transmission time interval that is after the first transmission time interval by at least the time delay.

Another apparatus for wireless communication at a UE is described. The apparatus may include means for receiving, from a base station, a configuration message indicating that transmission of a control message is to be repeated via a set of control message repetitions, identifying that a repetition instance of the set of control message repetitions is designated as a triggering instance for a delay parameter, where the delay parameter corresponds to a time delay between the triggering instance and an operation associated with the control message, receiving, from the base station, the triggering instance during a first transmission time interval, and performing the operation during a second transmission time interval that is after the first transmission time interval by at least the time delay.

A non-transitory computer-readable medium storing code for wireless communication at a UE is described. The code may include instructions executable by a processor to receive, from a base station, a configuration message indicating that transmission of a control message is to be repeated via a set of control message repetitions, identify that a repetition instance of the set of control message repetitions is designated as a triggering instance for a delay parameter, where the delay parameter corresponds to a time delay between the triggering instance and an operation associated with the control message, receive, from the base station, the triggering instance during a first transmission time interval, and perform the operation during a second transmission time interval that is after the first transmission time interval by at least the time delay.

In some examples of the method, apparatuses, and non-transitory computer-readable medium described herein, performing the operation further may include operations, features, means, or instructions for monitoring for a data message scheduled by the control message during the second transmission time interval that may be at least the time delay after receipt of the triggering instance.

In some examples of the method, apparatuses, and non-transitory computer-readable medium described herein, performing the operation further may include operations, features, means, or instructions for transmitting an uplink data message during the second transmission time interval that may be at least the time delay after receipt of the triggering instance.

In some examples of the method, apparatuses, and non-transitory computer-readable medium described herein, performing the operation further may include operations, features, means, or instructions for transmitting a sidelink data message during the second transmission time interval that may be at least the time delay after receipt of the triggering instance.

In some examples of the method, apparatuses, and non-transitory computer-readable medium described herein, performing the operation further may include operations, features, means, or instructions for transmitting an acknowledgement for the control message during the second transmission time interval that may be at least the time delay after receipt of the triggering instance.

In some examples of the method, apparatuses, and non-transitory computer-readable medium described herein, performing the operation further may include operations, features, means, or instructions for applying a transmit power control in transmitting a message during the second transmission time interval that may be at least the time delay after receipt of the triggering instance, where the transmit power control may be based on a power control command included in the triggering instance.

In some examples of the method, apparatuses, and non-transitory computer-readable medium described herein, the message includes at least one of an uplink message, a downlink message, a sidelink message, or a combination thereof. In some examples of the method, apparatuses, and non-transitory computer-readable medium described herein, performing the operation further may include operations, features, means, or instructions for transmitting a random access channel message for the control message during the second transmission time interval that may be at least the time delay after receipt of the triggering instance.

In some examples of the method, apparatuses, and non-transitory computer-readable medium described herein, performing the operation further may include operations, features, means, or instructions for switching to an updated delay parameter during the second transmission time interval that may be at least the time delay after receipt of the triggering instance, where the updated delay parameter corresponds to a minimum time delay between the triggering instance and receipt of a data message scheduled by the control message.

In some examples of the method, apparatuses, and non-transitory computer-readable medium described herein, performing the operation further may include operations, features, means, or instructions for transmitting an alert message in response to the control message during the second transmission time interval that may be at least the time delay after receipt of the triggering instance.

In some examples of the method, apparatuses, and non-transitory computer-readable medium described herein, the alert message includes at least one of an earthquake and tsunami warning system message, a commercial mobile alert system message, or a combination thereof. Some examples of the method, apparatuses, and non-transitory computer-readable medium described herein may further include operations, features, means, or instructions for receiving an indication that the time delay may be to be calculated based on a parameter associated with the repetition instance designated as the triggering instance.

Some examples of the method, apparatuses, and non-transitory computer-readable medium described herein may further include operations, features, means, or instructions for identifying the parameter associated with the triggering instance, and calculating the time delay based on the identified parameter associated with the triggering instance. In some examples of the method, apparatuses, and non-transitory computer-readable medium described herein, the parameter associated with the triggering instance includes at least one of a starting symbol of the control message, an ending symbol of the control message, a duration of the control message, or a combination thereof.

In some examples of the method, apparatuses, and non-transitory computer-readable medium described herein, the starting symbol of the control message corresponds to a start of the first transmission time interval and the ending symbol of the control message corresponds to an end of the first transmission time interval. In some examples of the method, apparatuses, and non-transitory computer-readable medium described herein, the parameter may be constant across a set of repetition instances designated as triggering instances.

Some examples of the method, apparatuses, and non-transitory computer-readable medium described herein may further include operations, features, means, or instructions for receiving an indication to drop a repetition instance, determining that the repetition instance to be dropped corresponds to the repetition instance designated as the triggering instance, and dropping the repetition instance based on receiving the indication.

In some examples of the method, apparatuses, and non-transitory computer-readable medium described herein, identifying that the repetition instance of the set of control message repetitions may be designated as the triggering instance further may include operations, features, means, or instructions for receiving, from the base station, an indication of that the repetition instance of the set of control message repetitions may be designated as the triggering instance via at least one of a master information block, a system information block, a radio resource control message, a medium access control (MAC) control element, a downlink control information, or a combination thereof.

In some examples of the method, apparatuses, and non-transitory computer-readable medium described herein, the repetition instance may be designated as a triggering instance based on the operation to be performed during the second transmission time interval.

In some examples of the method, apparatuses, and non-transitory computer-readable medium described herein, a value of the delay parameter may be based on repetition instance designated as the triggering instance. In some examples of the method, apparatuses, and non-transitory computer-readable medium described herein, the triggering instance includes a first repetition of the control message or a last repetition of the control message.

In some examples of the method, apparatuses, and non-transitory computer-readable medium described herein, the triggering instance includes a repetition of the control message included in a subset of repetitions of the control message, where the subset of repetitions of the control message includes a maximum number of repetitions supported by the UE.

In some examples of the method, apparatuses, and non-transitory computer-readable medium described herein, the control message includes at least one of a physical downlink control channel, a physical sidelink control channel, or a combination thereof.

A method of wireless communication at a base station is described. The method may include transmitting, to a UE, a configuration message indicating that transmission of a control message is to be repeated via a set of control message repetitions, transmitting, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message, transmitting, to the UE, the triggering instance during a first transmission time interval, and transmitting, to the UE, the data message during a second transmission time interval that is at least the minimum time delay after receipt of the triggering instance.

An apparatus for wireless communication is described. The apparatus may include a processor, memory coupled with the processor, and instructions stored in the memory. The instructions may be executable by the processor to cause the apparatus to transmit, to a UE, a configuration message indicating that transmission of a control message is to be repeated via a set of control message repetitions, transmit, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message, transmit, to the UE, the triggering instance during a first transmission time interval, and transmit, to the UE, the data message during a second transmission time interval that is at least the minimum time delay after receipt of the triggering instance.

Another apparatus for wireless communication at a base station is described. The apparatus may include means for transmitting, to a UE, a configuration message indicating that transmission of a control message is to be repeated via a set of control message repetitions, transmitting, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message, transmitting, to the UE, the triggering instance during a first transmission time interval, and transmitting, to the UE, the data message during a second transmission time interval that is at least the minimum time delay after receipt of the triggering instance.

A non-transitory computer-readable medium storing code for wireless communication at a base station is described. The code may include instructions executable by a processor to transmit, to a UE, a configuration message indicating that transmission of a control message is to be repeated via a set of control message repetitions, transmit, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message, transmit, to the UE, the triggering instance during a first transmission time interval, and transmit, to the UE, the data message during a second transmission time interval that is at least the minimum time delay after receipt of the triggering instance.

In some examples of the method, apparatuses, and non-transitory computer-readable medium described herein, the triggering instance includes a first repetition of the control message or a last repetition of the control message. In some examples of the method, apparatuses, and non-transitory computer-readable medium described herein, the triggering instance includes a repetition of the control message included in a subset of a set of configured repetitions of the control message, where the set of configured repetitions of the control message includes a maximum number of repetitions supported by the UE.

In some examples of the method, apparatuses, and non-transitory computer-readable medium described herein, transmitting the indication further may include operations, features, means, or instructions for configuring the UE to calculate the minimum time delay based on a parameter associated with the repetition instance designated as the triggering instance.

In some examples of the method, apparatuses, and non-transitory computer-readable medium described herein, the parameter associated with the triggering instance includes at least one of a starting symbol of the control message, an ending symbol of the control message, a duration of the control message, or a combination thereof. In some examples of the method, apparatuses, and non-transitory computer-readable medium described herein, the starting symbol of the control message corresponds to a start of the first transmission time interval and the ending symbol of the control message corresponds to an end of the first transmission time interval.

In some examples of the method, apparatuses, and non-transitory computer-readable medium described herein, the starting symbol of the control message and the ending symbol of the control message each correspond to specific symbols of the first transmission time interval, where the specific symbols may be either predetermined or may be indicated to the UE by the base station.

In some examples of the method, apparatuses, and non-transitory computer-readable medium described herein, the parameter may be constant across a set of repetition instances designated as triggering instances.

Some examples of the method, apparatuses, and non-transitory computer-readable medium described herein may further include operations, features, means, or instructions for receiving, from the UE, a capability of the UE to support a set of minimum delay parameters, and transmitting, to the UE, an indication of the minimum delay parameter based on the capability of the UE.

In some examples of the method, apparatuses, and non-transitory computer-readable medium described herein, transmitting the indication that the repetition instance of the set of control message repetitions may be designated as the triggering instance further may include operations, features, means, or instructions for transmitting, to the UE, the indication of that the repetition instance of the set of control message repetitions may be designated as the triggering instance via at least one of a master information block, a system information block, a radio resource control message, a medium access control (MAC) control element, a downlink control information, or a combination thereof.

In some examples of the method, apparatuses, and non-transitory computer-readable medium described herein, a value of the minimum delay parameter may be based on repetition instance designated as the triggering instance. In some examples of the method, apparatuses, and non-transitory computer-readable medium described herein, the control message includes at least one of a physical downlink control channel, a physical sidelink control channel, or a combination thereof.

In some examples of the method, apparatuses, and non-transitory computer-readable medium described herein, transmitting the indication of the minimum delay parameter further may include operations, features, means, or instructions for transmitting, to the UE, the indication of the minimum delay parameter via a radio resource control message.

A method of wireless communication at a base station is described. The method may include transmitting, to a UE, a configuration message indicating that transmission of a control message is to be repeated via a set of control message repetitions, transmitting, to the UE, an indication that a repetition instance of the set of control message repetitions is designated as a triggering instance for a delay parameter, where the delay parameter corresponds to a time delay between the triggering instance and an operation associated with the control message, transmitting, to the UE, the triggering instance during a first transmission time interval, and performing the operation during a second transmission time interval that is after the first transmission time interval by at least the time delay.

An apparatus for wireless communication is described. The apparatus may include a processor, memory coupled with the processor, and instructions stored in the memory. The instructions may be executable by the processor to cause the apparatus to transmit, to a UE, a configuration message indicating that transmission of a control message is to be repeated via a set of control message repetitions, transmit, to the UE, an indication that a repetition instance of the set of control message repetitions is designated as a triggering instance for a delay parameter, where the delay parameter corresponds to a time delay between the triggering instance and an operation associated with the control message, transmit, to the UE, the triggering instance during a first transmission time interval, and perform the operation during a second transmission time interval that is after the first transmission time interval by at least the time delay.

Another apparatus for wireless communication at a base station is described. The apparatus may include means for transmitting, to a UE, a configuration message indicating that transmission of a control message is to be repeated via a set of control message repetitions, transmitting, to the UE, an indication that a repetition instance of the set of control message repetitions is designated as a triggering instance for a delay parameter, where the delay parameter corresponds to a time delay between the triggering instance and an operation associated with the control message, transmitting, to the UE, the triggering instance during a first transmission time interval, and performing the operation during a second transmission time interval that is after the first transmission time interval by at least the time delay.

A non-transitory computer-readable medium storing code for wireless communication at a base station is described. The code may include instructions executable by a processor to transmit, to a UE, a configuration message indicating that transmission of a control message is to be repeated via a set of control message repetitions, transmit, to the UE, an indication that a repetition instance of the set of control message repetitions is designated as a triggering instance for a delay parameter, where the delay parameter corresponds to a time delay between the triggering instance and an operation associated with the control message, transmit, to the UE, the triggering instance during a first transmission time interval, and perform the operation during a second transmission time interval that is after the first transmission time interval by at least the time delay.

In some examples of the method, apparatuses, and non-transitory computer-readable medium described herein, performing the operation further may include operations, features, means, or instructions for transmitting a data message scheduled by the control message during the second transmission time interval that may be at least the time delay after receipt of the triggering instance.

In some examples of the method, apparatuses, and non-transitory computer-readable medium described herein, performing the operation further may include operations, features, means, or instructions for receiving an uplink data message during the second transmission time interval that may be at least the time delay after receipt of the triggering instance.

In some examples of the method, apparatuses, and non-transitory computer-readable medium described herein, performing the operation further may include operations, features, means, or instructions for receiving an acknowledgement for the control message during the second transmission time interval that may be at least the time delay after receipt of the triggering instance.

In some examples of the method, apparatuses, and non-transitory computer-readable medium described herein, performing the operation further may include operations, features, means, or instructions for receiving a random access channel message for the control message during the second transmission time interval that may be at least the time delay after receipt of the triggering instance.

In some examples of the method, apparatuses, and non-transitory computer-readable medium described herein, transmitting the indication further may include operations, features, means, or instructions for configuring the UE to calculate the time delay based on a parameter associated with the repetition instance designated as the triggering instance.

In some examples of the method, apparatuses, and non-transitory computer-readable medium described herein, the parameter associated with the triggering instance includes at least one of a starting symbol of the control message, an ending symbol of the control message, a duration of the control message, or a combination thereof.

In some examples of the method, apparatuses, and non-transitory computer-readable medium described herein, the starting symbol of the control message corresponds to a start of the first transmission time interval and the ending symbol of the control message corresponds to an end of the first transmission time interval. In some examples of the method, apparatuses, and non-transitory computer-readable medium described herein, the parameter may be constant across a set of repetition instances designated as triggering instances.

In some examples of the method, apparatuses, and non-transitory computer-readable medium described herein, transmitting the indication that the repetition instance of the set of control message repetitions may be designated as the triggering instance further may include operations, features, means, or instructions for transmitting, to the UE, the indication of that the repetition instance of the set of control message repetitions may be designated as the triggering instance via at least one of a master information block, a system information block, a radio resource control message, a medium access control (MAC) control element, a downlink control information, or a combination thereof.

In some examples of the method, apparatuses, and non-transitory computer-readable medium described herein, the repetition instance may be designated as a triggering instance based on the operation to be performed during the second transmission time interval. In some examples of the method, apparatuses, and non-transitory computer-readable medium described herein, a value of the delay parameter may be based on repetition instance designated as the triggering instance.

In some examples of the method, apparatuses, and non-transitory computer-readable medium described herein, the triggering instance includes a first repetition of the control message or a last repetition of the control message. In some examples of the method, apparatuses, and non-transitory computer-readable medium described herein, the triggering instance includes a repetition of the control message included in a subset of repetitions of the control message, where the subset of repetitions of the control message includes a maximum number of repetitions supported by the UE.

In some examples of the method, apparatuses, and non-transitory computer-readable medium described herein, the control message includes at least one of a physical downlink control channel, a physical sidelink control channel, or a combination thereof.

DETAILED DESCRIPTION

Figure 1:
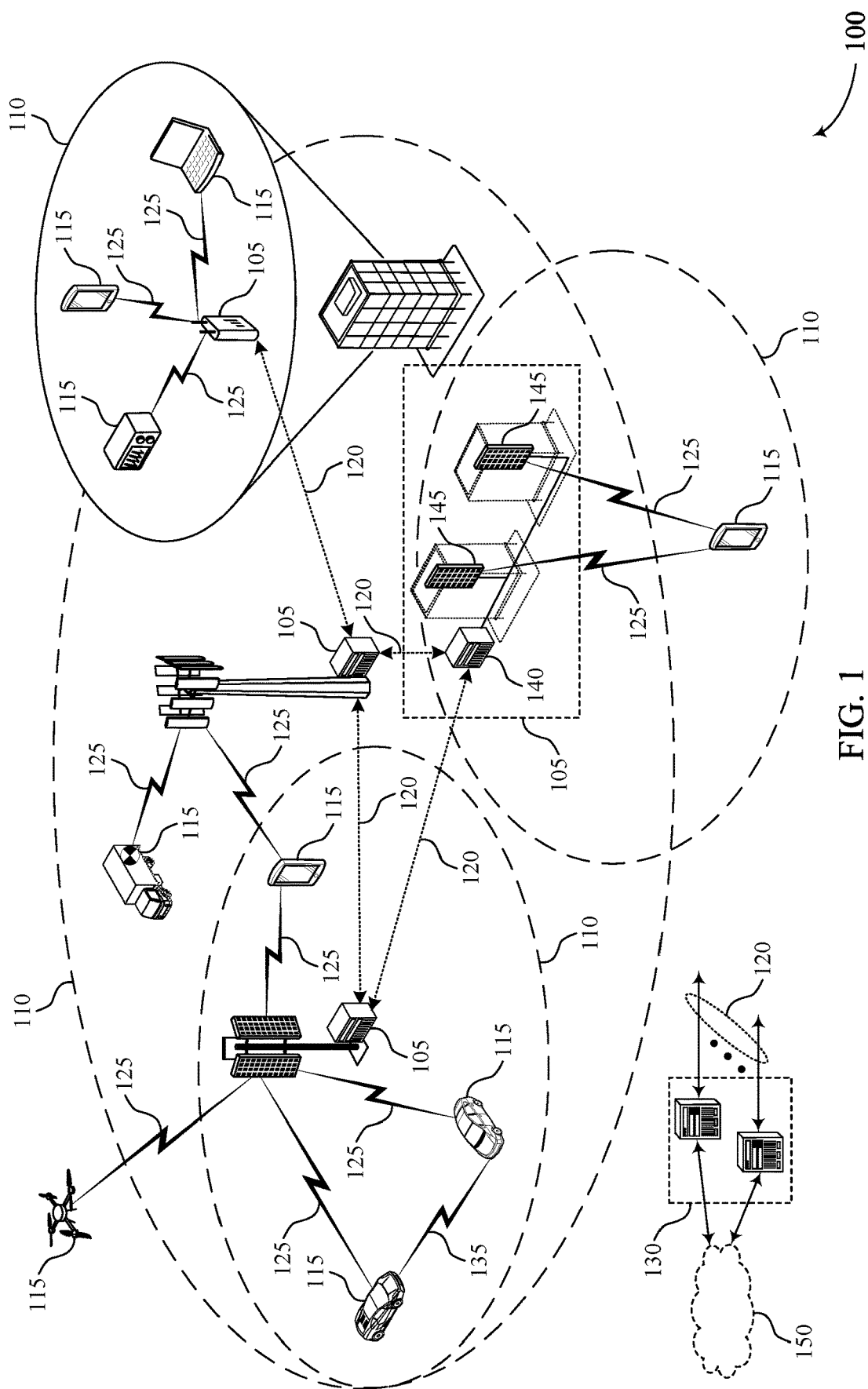
FIG. 1 illustrates an example of a system for wireless communications that supports delay parameter determination for control message repetition in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Some wireless communications systems may provide for physical downlink control channel repetition to improve control channel reliability while maintaining low latency (e.g., for ultra-reliable low-latency communications systems). For example, a base station may transmit an initial control message indicating resources for a data transmission (e.g., a physical downlink shared channel transmission). In some cases, the base station may transmit multiple repetitions (or copies) of the initial control message (physical downlink control channel) to enable a UE to combine multiple repetitions of the physical downlink control channel and decode the physical downlink control channel.

As such, in some wireless communications systems, a UE may be configured to perform various operations dependent on a timing of the physical downlink control channel. For example, the UE may be configured to implement a scheduling delay (k0) between receiving a physical downlink control channel and receiving a downlink data (e.g., in physical downlink shared channel) from the base station. Additionally, the UE may be configured to implement a scheduling delay (k2) between receiving a physical downlink control channel and transmitting uplink data (e.g., in physical uplink shared channel) to the base station. In some cases, the UE may be configured to implement a scheduling delay (kSL) between receiving a physical downlink control channel and transmitting sidelink data to another UE. Additionally or alternatively, the operations performed by the UE may be based on at least one of minimum-k configured values, a transmit power control accumulation deadline, action time for physical downlink control channel-ordered random access channel, or a combination thereof. Since, the UE is configured to use a timing of a physical downlink control channel to perform the various operations, it may be desirable to identify repetition of a physical downlink control channel for accurate determination of a timing event.

According to one or more aspects of the present disclosure, a base station may configure the UE to use the Nth copy (or Nth repetition) of the physical downlink control channel (e.g., the first copy of the physical downlink control channel, the last copy of the physical downlink control channel, etc.) as a triggering instance. For example, the base station may transmit an indication of a copy of the physical downlink control channel for the UE to consider as a triggering instance. The triggering instance, as indicated by the base station, may be the repetition which is a basis for various timing events. Additionally, the UE may be configured to determine one or more scheduling delays based not only on a specific triggering instance of the physical downlink control channel, but also a specific temporal part of the physical downlink control channel triggering instance. For instance, the base station may configure the UE to use a starting symbol or an ending symbol or even a duration of the triggering repetition when measuring the delay.

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of additional wireless communications systems and process flows. Aspects of the disclosure are further illustrated by and described with reference to apparatus diagrams, system diagrams, and flowcharts that relate to delay parameter determination for control message repetition.

FIG. 1 illustrates an example of a wireless communications system 100 that supports delay parameter determination for control message repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may provide for receiving, from a base station 105, a configuration message indicating that transmission of a control message is to be repeated via a set of control message repetitions. The UE 115 may identify that a repetition instance of the set of control message repetitions is designated as a triggering instance for a delay parameter, where the delay parameter corresponds to a time delay between the triggering instance and an operation associated with the control message. The UE 115 may then receive, from the base station 105, the triggering instance during a first transmission time interval, and perform the operation during a second transmission time interval that is after the first transmission time interval by at least the time delay.

Figure 2:
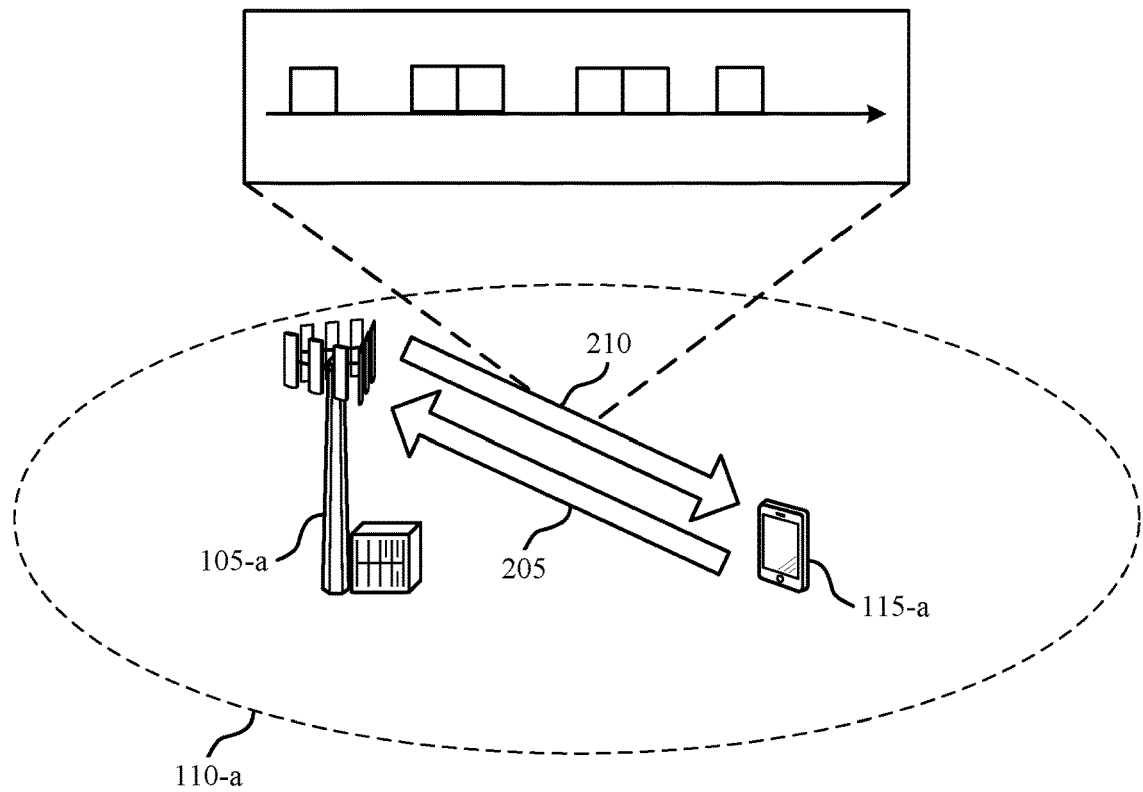
FIG. 2 illustrates an example of a wireless communications system that supports delay parameter determination for control message repetition in accordance with aspects of the present disclosure.

FIG. 2 illustrates an example of a wireless communications systems 200 that supports delay parameter determination for control message repetition in accordance with aspects of the present disclosure. In some examples, the wireless communications system 200 may implement aspects of the wireless communications system 100.

The wireless communications system 200 may include base station 105-a and UE 115-a, which may be examples of the corresponding devices described with reference to FIG. 1. Base station 105-a may provide network coverage for a geographic area 110-a. The UE 115-a and the base station 105-a may communicate using downlink communication channel 205 and uplink communication channel 210. In some cases, the wireless communications system 200 (e.g., an NR system) may support control channel enhancements. For example, base station 105-a may support control message 215 repetition to increase control channel reliability (e.g., physical downlink control channel reliability). In some wireless communications systems, a base station 105-a may transmit control information conveyed by a control channel (e.g., via the physical downlink control channel) that may indicate to the UE 115-a, a location (e.g., the time and frequency resources) of a data channel (e.g., via the physical downlink shared channel). Specifically, wireless communications systems (such as wireless communications system 200) may implement control messages (e.g., physical downlink control channel messages transmitted by a base station 105-a) to grant upcoming resources for data transmissions (e.g., where the data transmissions are sent over a physical downlink shared channel).

In some cases, the base station 105-a may transmit a number of single instances of the control information 215 during a number of slots (or transmission time intervals). The UE 115-a may attempt to receive and decode each instance of the control information 215 independently. For example, if the UE 115-a is unable to receive and decode a first instance of the control information 215, the UE 115-a may discard the unsuccessfully received and/or decoded control information 215 and may attempt to receive and decode a second instance of the control information 215 without storing any information associated with the first instance. This process may repeat for a monitoring occasion of each slot for the length of a time window (e.g., a random access response window) until the UE 115-a successfully receives and decodes a control information 215 transmission or until the time window length expires.

In some wireless communications systems, the base station 105-a may transmit a number of repetitions (copies, instances, etc.) of the control information 215. The UE 115-a may perform blind decoding on the received instances of the physical downlink control channel. Because the base station 105-a may transmit physical downlink control channels for multiple UEs, the UE 115-a may combine multiple physical downlink control channel instances to identify upcoming resources for data transmissions for that UE 115-a. In some instances, a receiver UE (e.g., UE 115-a) may receive information about which physical downlink control channels are repeated copies of each other. The UE 115-a may utilize the information to soft-combine multiple copies of the physical downlink control channel prior to performing blind-decoding. Combining multiple copies (or instances) of physical downlink control channel may result in an improved signal to noise ratio, which in turn results in an improved physical downlink control channel coverage. Some wireless communications systems may implement such control channel repetitions physical downlink control channel scheduling random access messages (msg2 or msgB). Additionally or alternatively, wireless communications system may apply physical downlink control channel repetitions in at least one of industrial internet of things (IIOT) scenarios, low-power scenarios, deep coverage scenarios, or a combination thereof.

In some examples, upon successful reception of the control information 215, the UE 115-a may decode the control information 215 and perform a parity check (e.g., a cyclic redundancy check) on the control information 215. Based on performing the parity check, the UE 115-a may determine that the control information 215 is relevant to a message from the base station 105-a. In cases when the decoding and the parity check are successful, the UE may determine that the message is decoded. Using such techniques, the base station 105-a may improve the reliability of downlink control information 215 (or control messages) transmitted to UE 115-a in the wireless communications system 200.

Thus, as described herein, some wireless communications systems provide for physical downlink control channel repetition to improve control channel reliability while maintaining low latency and high efficiency. For example, a base station 105-a may transmit an initial control message indicating resources for a data transmission (e.g., a physical downlink shared channel transmission). In some cases, the base station 105-a may transmit multiple repetitions (or copies) of the initial control message to enable a UE to combine multiple repetitions of the physical downlink control channel and decode the physical downlink control channel.

As such, in some wireless communications systems, a UE 115-a may be configured to perform various operations (or timing events) dependent on a timing of the physical downlink control channel. For example, the UE 115-a may be configured to implement a scheduling delay (k0) between receiving a physical downlink control channel and receiving a downlink data (e.g., in physical downlink shared channel) from the base station 105-a. Additionally or alternatively, the UE 115-a may be configured to implement a scheduling delay (k2) between receiving a physical downlink control channel and transmitting uplink data (e.g., in physical uplink shared channel) to the base station 105-a. In some cases, the UE 115-a may be configured to implement a scheduling delay (kSL) between receiving a physical downlink control channel and transmitting sidelink data to another UE 115. Additionally or alternatively, the operations performed by the UE 115-a may be based on at least one of minimum-k configured values, a transmit power control accumulation deadline, action time for physical downlink control channel-ordered random access channel, or a combination thereof. Since, the UE 115-a is configured to use a timing of a physical downlink control channel to perform the various operations, it may be desirable to identify a repetition instance of a physical downlink control channel designated as a trigger for the timing event.

According to one or more aspects of the present disclosure, the base station 105-a may transmit a configuration message indicating that transmission of a control message (or control information 215) is to be repeated via a set of control message repetitions. For example, the base station 105-a may transmit an RRC message to configure the UE 115-a with a set of physical downlink control channel repetitions. The UE 115-a may then identify an indication that a repetition instance of the set of control message repetitions is designated as a triggering instance for a delay parameter. The delay parameter, as described herein, may correspond to a time delay between the triggering instance and receipt of an operation (or timing event) based on the control message (or physical downlink control channel). That is, the base station may indicate the UE 115-a to consider the Nth copy of the physical downlink control channel (e.g., the 1st copy of the physical downlink control channel, the last copy of the physical downlink control channel, etc.) when calculating scheduling delays for some operations. In some examples, a reference physical downlink control channel candidate may be defined as a candidate that ends later in time among the two linked physical downlink control channel candidates in the time domain. Additionally or alternatively, a reference physical downlink control channel candidate may be defined as a candidate that ends earlier in time among the two linked physical downlink control channel candidates in the time domain.

In some examples, the UE 115-a may be configured to determine a scheduling delay (k0) between receipt of the physical downlink control channel and a data message scheduled by the physical downlink control channel (via a physical downlink shared channel). In some cases, the data message is scheduled upon expiration of the scheduling delay (k0) after receiving the physical downlink control channel. According to one or more aspects of the present disclosure, the base station 105-a may indicate a particular repetition instance of the physical downlink control channel as a triggering instance. For example, the base station 105-a may indicate that the Nth instance of the physical downlink control channel (e.g., the 1st instance of the physical downlink control channel, the last instance of the physical downlink control channel, a repetition of the physical downlink control channel included in a subset of a set of configured repetitions of the physical downlink control channel, etc.) is the triggering instance. The UE 115-a may monitor for the triggering instance of the physical downlink control channel. For instance, if the base station 105-a indicates that the Nth instance of the physical downlink control channel is the triggering instance, the UE 115-a may begin calculating the scheduling delay starting from the Nth instance of the physical downlink control channel (or the Nth repetition of the physical downlink control channel). The UE 115-a may then monitor for a data message scheduled by the physical downlink control channel during a later transmission time interval (i.e., a transmission time interval that occurs after the transmission time interval carrying the Nth instance of the physical downlink control channel). In some examples, the UE 115-a may use the triggering instance to calculate a scheduling offset to identify whether a default beam is to be used for physical downlink shared channel or channel state information reference signal reception.

Additionally or alternatively, the UE 115-a may be configured to determine a scheduling delay (k2) between receipt of the physical downlink control channel and transmitting an uplink message (via a physical uplink shared channel). In some cases, the UE 115-a is configured to transmit an uplink message upon expiration of the scheduling delay (k2) after receiving the triggering instance of the physical downlink control channel. As described herein, the base station 105-a may indicate that the Nth instance of the physical downlink control channel (e.g., the 1st instance of the physical downlink control channel, the last instance of the physical downlink control channel, a repetition of the physical downlink control channel included in a subset of a set of configured repetitions of the physical downlink control channel, etc.) is the triggering instance. The UE 115-a may monitor for the triggering instance of the physical downlink control channel, and may transmit an uplink data message upon expiration of the scheduling delay (k2) when calculated from the Nth instance of the physical downlink control channel (or the Nth repetition of the physical downlink control channel). As described herein, the UE 115-a may transmit the uplink message during a transmission time interval that occurs at least a time period corresponding to the scheduling delay (k2) after the transmission time interval carrying the Nth instance of the physical downlink control channel.

In some examples, the UE 115-a may be configured to determine a scheduling delay (kSL) between receipt of the physical downlink control channel and transmitting a sidelink data message (using a sidelink mode 1 grant) to another receiving device. In some cases, the UE 115-a is configured to transmit the sidelink message upon expiration of the scheduling delay (kSL) after receiving the triggering instance of the physical downlink control channel. Similar to methods described herein, the UE 115-a may monitor for a triggering instance of the physical downlink control channel, and may transmit an uplink data message upon expiration of the scheduling delay (kSL) when calculated from the triggering instance of the physical downlink control channel. In some cases, the UE 115-a may transmit the sidelink message during a transmission time interval that occurs at least a time period corresponding to the scheduling delay (kSL) after the transmission time interval carrying the triggering instance of the physical downlink control channel.

Certain physical downlink control channels may include an acknowledgement message from a UE 115-a. For example, a UE 115-*a* may be configured to acknowledge receipt of a downlink control information (in a physical downlink control channel) indicating that a semi-persistent assignment is terminated. In such cases, the UE 115-*a* may be configured to determine a scheduling delay (k1Ack) between receipt of a control message (via a physical downlink control channel) and transmitting an acknowledgement of the control message. In some cases, the UE 115-*a* is configured to transmit the acknowledgement upon expiration of the scheduling delay (k1Ack) after receiving the triggering instance of the physical downlink control channel. Upon identifying (e.g., by receiving an indication from the base station 105-*a*) a repetition of the physical downlink control channel designated as the triggering instance, the UE 115-*a* may monitor for the triggering instance of the physical downlink control channel, and may transmit an acknowledgement upon expiration of the scheduling delay (k1Ack). In some cases, the UE 115-*a* may transmit the acknowledgement for the control message during a transmission time interval that occurs at least a time period corresponding to the scheduling delay (k1Ack) after the transmission time interval carrying the triggering instance of the physical downlink control channel.

In some wireless communications systems, a UE may be expected to receive a physical downlink control channel and a physical downlink shared channel in the same time slot. The UE may buffer all samples from the physical downlink control channel repetitions on the chance that there is a grant. If the physical downlink control channel carries a grant, then the UE uses the buffered samples to identify the grant. In some cases, this buffering may consume an increased amount of power. Minimum-k configured values may specify to the UE that there will be a grant after a delay of at least "k" time units after reception of an instance of a physical downlink control channel. In some examples, the UE can close its radio frequency frontend for "k" time units and decode the physical downlink control channel in an offline operation. In some examples, the UE may be configured with a list of minimum-k configured values. In some cases, the UE may select a group of minimum-k configured values and the base station may select one minimum-k configured value from the group of minimum-k configured values. In some cases, the base station may select one minimum-k configured value from the group of minimum-k configured values based on a UE capability.

In some aspects, the UE 115-*a* may be configured to determine a minimum delay (minimum-k configured values) between receipt of a control message (via a physical downlink control channel) and receipt of a data message scheduled by the control message. In some cases, the UE 115-*a* may receive or otherwise identify the triggering instance of the physical downlink control channel. Upon identifying a repetition of the physical downlink control channel designated as the triggering instance, the UE 115-*a* may monitor for the triggering instance of the physical downlink control channel. The UE 115-*a* may receive repetition of the physical downlink control channel designated as the triggering instance, and may monitor for a data message upon expiration of the minimum delay after reception of the triggering instance. In some cases, the UE 115-*a* may monitor for the data message during a transmission time interval that occurs at least a time period corresponding to the minimum delay (based on minimum-k configured values) after the transmission time interval carrying the triggering instance of the physical downlink control channel. In some instances, if a second grant arrives later than a first grant, then a signal scheduled by the second grant may occur later than a signal scheduled by the first grant. In these cases, if one or both of the first grant and the second grant is transmitted using repetitions, the determination of which grant arrives later may be based on the arrival time of the reference or triggering instance of the grant or grants that are transmitted using the repetitions.

In some examples, the UE 115-*a* may determine a minimum delay between a scheduled grant and a scheduled signal or channel, that allows the beam of the scheduled signal to be indicated in the scheduling grant. If delay is less than the value of the minimum delay, scheduling may be possible, but the base station 105-*a* may not be able to indicate the beam (because there is not enough time for the UE 115-*a* to change the beam in accordance with this indication). In such cases, the base station 105-*a* may indicate or the UE 115-*a* may be configured to use a default beam, such as a beam for another physical channel, such as a PDCCH (physical downlink control channel).

In some aspects, a UE may receive an uplink grant and a power control command in that uplink grant. In some cases, a physical uplink shared channel may be based on the power control command (or transmit power control). In some cases, the UE may receive a downlink control information dedicated to transmit power control (carrying transmit power control bits). In some cases, the UE may receive the power control command close to an uplink data transmission opportunity for the UE. In such cases, the UE may be unable to decode the transmit power control within that limited amount of time between reception of the transmit power control and transmission of an uplink message. In some examples, the UE may only consider one or more power control commands (accumulate or calculate otherwise) received prior to a threshold time. That is, the UE may determine to not consider a transmit power control if the transmit power control is included in a downlink control information received beyond a threshold time.

In determining an accumulation deadline of a transmit power control for a scheduled physical uplink shared channel or a physical uplink control channel, the UE 115-*a* may be configured to determine a delay parameter between receipt of a control message (via a physical downlink control channel) and applying a transmit power control. In some cases, the UE 115-*a* may receive or otherwise identify the triggering instance of the physical downlink control channel. Upon identifying a repetition of the physical downlink control channel designated as the triggering instance, the UE 115-*a* may monitor for the reception of the triggering instance of the physical downlink control channel. The UE 115-*a* may receive repetition of the physical downlink control channel designated as the triggering instance, and may apply a transmit power control in transmitting a message upon expiration of the minimum delay (based on the delay parameter) after reception of the triggering instance. In some examples, the message may include at least one of an uplink message, a downlink message, a sidelink message, or a combination thereof. In some cases, the UE 115-*a* may apply the transmit power control during a transmission time interval that occurs at least a time period corresponding to the minimum delay (based on the delay parameter associated with the transmit power control) after the transmission time interval carrying the triggering instance of the physical downlink control channel. In some cases, a separate accumulation deadline may be defined for each physical downlink control channel repetition, or for each group of physical downlink control channel repetitions, and thus different groups could be transmitted at different powers, if additional transmit power control commands are received in a time duration between multiple deadlines.

In some aspects, an action time may be defined for a physical downlink control channel-order. In some examples, a UE 115-a may perform one or more operations in accordance with a physical downlink control channel. For instance, the physical downlink control channel may configure a UE to send a random access channel. When the UE 115-a is connected to the base station 105-a, the base station 105-a may request the UE 115-a to send a random access channel upon determining that the timing of the UE 115-a is turned off. In some cases, the base station may utilize the random access channel to transmit timing advance commands. In some cases, the random access channel may be associated with some dedicated resources. Additionally or alternatively, an action time defined for a physical downlink control channel-order may include determining a time at which toggling/changing of operating minimum-k value as indicated in physical downlink control channel will take effect.

According to one or more aspects of the present disclosure, the UE 115-a may be configured to determine a delay parameter between receipt of a control message (via a physical downlink control channel) and performing a physical downlink control channel-ordered action. In some cases, the UE 115-a may receive or otherwise identify the triggering instance of the physical downlink control channel. Upon identifying a repetition of the physical downlink control channel designated as the triggering instance, the UE 115-a may monitor for the reception of the triggering instance of the physical downlink control channel. The UE 115-a may receive repetition of the physical downlink control channel designated as the triggering instance, and may transmit a random access channel message for the physical downlink control channel after reception of the triggering instance. Additionally or alternatively, after receiving the triggering instance, the UE 115-a may switch to an updated delay parameter during a transmission time interval that is at least a time delay after receipt of the triggering instance. Additionally or alternatively, after receiving the triggering instance, the UE 115-a may transmit an alert message in response to the physical downlink control channel. In some examples, the alert message may include at least one of an earthquake and tsunami warning system message, a commercial mobile alert system message, or a combination thereof. As described herein, the UE 115-a may perform one or more physical downlink control channel-ordered actions during a transmission time interval that occurs at least a time period corresponding to the time delay after the transmission time interval carrying the triggering instance of the physical downlink control channel.

According to one or more aspects of the present disclosure, the base station 105-a may transmit an indication of a copy or the UE 115-a may otherwise identify e.g., by being hardwired) a copy of the physical downlink control channel for the UE 115-a to consider as a triggering repetition (or a triggering instance). For instance, the UE 115-a may identify that the triggering instance is a first repetition of the physical downlink control channel (or control message) or a last repetition of the physical downlink control channel. In some examples, the triggering instance may include a repetition of the physical downlink control channel included in a subset of a set of configured repetitions of the physical downlink control channel. The triggering instance, as indicated by the base station, may be the repetition from which various timing events are based. In some cases, the base station 105-a may indicate the triggering repetition using at least one of a master information block, a system information block, a radio resource control message, a medium access control (MAC) control element, a downlink control information, or a combination thereof. In some cases, the triggering instance may be explicitly specified or predefined for the UE 115-a, and the UE 115-a may identify the triggering instance without a signaling message.

In some cases, the set of configured repetitions of the physical downlink control channel may include a maximum number of repetitions supported by the UE 115-a. For example, the base station 105-a may include that the triggering instance is the Mth physical downlink control channel, where M is any element in a subset of S={1, 2, . . . R}, where R is the max number of repetitions. In an example of scheduling delay k1 for physical downlink control channel acknowledgement, there may be an acknowledgement resource provisioned corresponding to each repetition, or to every R consecutive repetitions. In some examples, an acknowledgement resource may be provisioned for some subsets of consecutive repetitions so as to allow early termination of physical downlink control channel repetition. In this case, a representative member for each of these subsets may be configured (e.g., as the last one in subset) and the set of these members may be the subset S={1, 2, . . . R}. As described herein, a UE 115-a may transmit an acknowledgement at time k1Ack after the last of the consecutive physical downlink control channel repetitions being acknowledged. In some examples, the configured values may be different for different repetitions. For examples, a k1Ack as defined herein, if carried in a downlink control information, may have the same value for all repetitions. However, the configured/reported capability of min-k1Ack value may be different for the first repetition vs a later repetition (e.g., extra time may be used by the UE 115-a to perform the combining, which may depend on the number of repetitions combined).

Additionally, the UE 115-a may be configured to determine a scheduling delay based not only on a specific triggering instance of the physical downlink control channel, but also a specific temporal part of the physical downlink control channel triggering instance. For instance, the base station 105-a may configure the UE 115-a to use a starting symbol or an ending symbol or even a duration of the triggering repetition when measuring the delay. In some examples, the base station 105-a may indicate a parameter associated with the triggering instance. The parameter associated with the triggering instance may include at least one of a starting symbol of the physical downlink control channel, an ending symbol of the physical downlink control channel, a duration of the physical downlink control channel, or a combination thereof. The UE 115-a may utilize the parameter to calculate a minimum delay. In some examples, the start or end or duration may be same or different for different repetitions of the physical downlink control channel. In some examples, the starting symbol of the physical downlink control channel may correspond to a start of a first transmission time interval over which the triggering instance of the physical downlink control channel is received by the UE 115-a, and the ending symbol of the physical downlink control channel may correspond to an end of the first transmission time interval. Additionally or alternatively, the starting symbol of the physical downlink control channel and the ending symbol of the physical downlink control channel may each correspond to specific symbols of the first transmission time interval, where the specific symbols are either predetermined or are indicated to the UE 115-a by the base station 105-*a*. As described herein, the parameter may be constant across a set of repetition instances designated as triggering instances.

In some examples, the UE 115-*a* may be configured to use the same definition of the one or more parameters for each copy of the physical downlink control channel, based on the start or end or duration of that copy. Alternatively, the UE 115-*a* may use a virtual copy created by aligning some parameters with the actual copy with some other values (e.g., with the values corresponding to a different copy of the physical downlink control channel). In one example, a first copy (or repetition) of the physical downlink control channel may include three OFDM symbols, and the parameter may indicate a first symbol of physical downlink control channel. Therefore, for subsequent copies (or repetitions), the UE 115-*a* may create a virtual copy that occupies three symbols, and ends at the true end of the corresponding actual copy. In some examples, the UE 115-*a* may be configured to align one or more repetitions of the physical downlink control channel to a start or an end of the slot carrying the physical downlink control channel. In such an example, the UE 115-*a* may be independent of intra-slot configuration.

In some cases, the UE 115-*a* may be configured to implement a different solution for different timing events. For example, in determining the scheduling delay k0, the UE 115-*a* may either use the first instance of the physical downlink control channel or the last instance of the physical downlink control channel as a triggering instance. In some examples, identifying the first instance of the physical downlink control channel as a triggering instance may allow starting physical downlink shared channel early, but may include buffering of physical downlink control channel and physical downlink shared channel. Alternatively, identifying the last instance of the physical downlink control channel as a triggering instance may incur more delay, but may avoid buffering the physical downlink shared channel. In determining a delay parameter for the minimum-k value change action time, identifying the last physical downlink control channel may be used by the UE 115-*a*. If the UE 115-*a* identifies the first instance of the physical downlink control channel as the triggering instance, the change may take effect before all repeated physical downlink control channels have been transmitted.

In some examples, the UE 115-*a* may receive an indication to drop a repetition instance (e.g., due to higher priority channels such as physical downlink control channel, physical downlink shared channel and positioning reference signal). Upon receiving the indication, the UE 115-*a* may determine that the repetition instance to be dropped corresponds to the repetition instance designated as the triggering instance. In some cases, the UE 115-*a* may have prior knowledge of the dropping. If UE 115-*a* has prior knowledge of the dropping, the UE 115-*a* may defer the dropping to a subsequent instance. As described herein, prior knowledge may be referred to as prior to the end of all the repetitions, or prior to the instance being dropped. In some examples, the UE 115-*a* may drop the triggering instance based on receiving the indication to drop the repetition instance. In some examples, the UE 115-*a* may designate a subsequent repetition instance as the triggering instance upon dropping the prior instance designated as the triggering instance.

Although the descriptions herein are based on identifying action times for various operations relative to a timing of a physical downlink control channel transmitted with repetitions, it is to be understood that the scope of the disclosure also encompasses the same principles being applied to other channels sent using repetitions. For example, similar operations related to finding minimum k0 value, minimum k2 value, a minimum scheduling time-offset between the scheduling grant and the scheduled channel or a signal that allows the scheduling grant to include an indication of the beam used to receive or transmit the scheduled signal or channel, and transmit power control accumulation, may also apply for physical sidelink control channel repetition and the described techniques may be utilized to identify a triggering instance. In some examples, the techniques described herein may be applied for a k1 scheduling delay between a physical downlink shared channel and an acknowledgement when the physical downlink shared channel is repeated. Similarly, the techniques described herein may be applied for a k1 SL scheduling delay between the physical sidelink shared channel and an acknowledgement on physical sidelink feedback channel when the physical sidelink shared channel is repeated. In some examples, the techniques described herein may be applied between an uplink transmission (such as a physical uplink shared channel or physical uplink control channel) and a related action of a base station where the uplink transmission is repeated. In some instances, the techniques described herein may be applied to a delay between a sidelink UE's reception of a physical sidelink feedback channel and transmission of the corresponding sidelink acknowledgement status back to the base station, when the physical sidelink feedback channel is repeated. some instances, the techniques described herein may be applied to the minimum-k parameters associated with any of the delays described herein.

Figure 3:
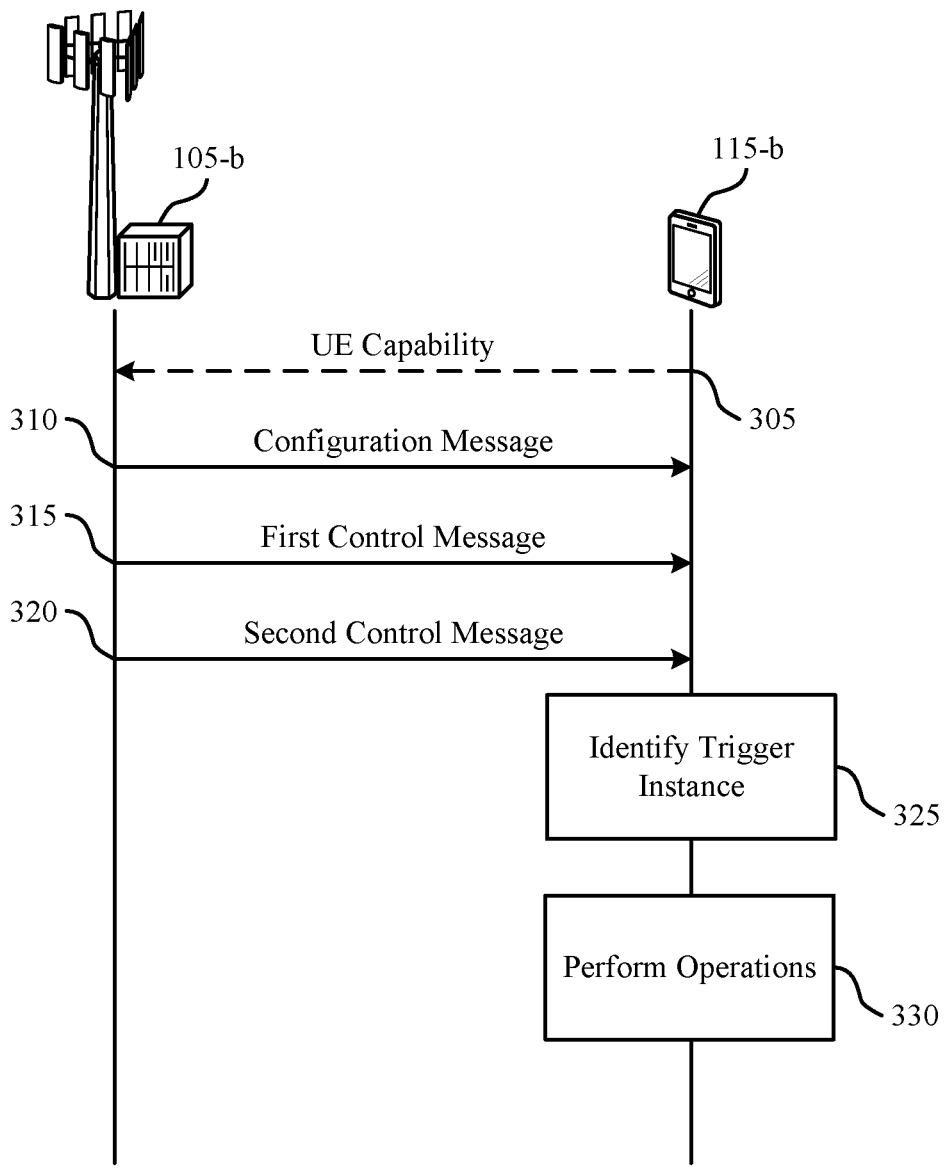
FIG. 3 illustrates an example of a process flow that supports delay parameter determination for control message repetition in accordance with aspects of the present disclosure.

FIG. 3 illustrates an example of a process flow 300 that supports delay parameter determination for control message repetition in accordance with aspects of the present disclosure. In some examples, the process flow 300 may implement aspects of wireless communication system 100 and the wireless communications system 200 described with reference to FIGS. 1 and 2, respectively. For example, the process flow 300 may be based on a configuration by a base station 105 or a UE 115, and implemented by the UE 115, for reduced power consumption, improved efficiency, and may promote low latency for wireless communications, among other benefits. The base station 105-*b* and the UE 115-*b* may be examples of a base station 105 and a UE 115, as described with reference to FIGS. 1 and 2.

In the following description of the process flow 300, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 300, and other operations may be added to the process flow 300.

At 305, the UE 115-*b* may optionally transmit a UE capability. In some cases, the UE capability may indicate a capability of the UE to support a set of minimum delay parameters.

At 310, the base station 105-*b* may transmit a configuration message indicating that transmission of a control message is to be repeated via a set of control message repetitions. As described herein, the control message may be or include a physical downlink control channel, a physical sidelink control channel.

At 315, the UE 115-*b* may receive a first control message and at 320, the UE 115-*b* may receive a second control message. The first control message and the second control message may be two copies (or repetitions) of the physical downlink control channel.

At 325, the UE 115-*b* may identify that a repetition instance of the set of control message repetitions is designated as a triggering instance for a delay parameter. In some cases, the delay parameter may correspond to a time delay between the triggering instance and an operation associated with the control message. Additionally or alternatively, the delay parameter may correspond to a minimum time delay between the triggering instance and receipt of a data message scheduled by the control message.

At 340, the UE 115-*b* may perform one or more operations during a second transmission time interval that is after the first transmission time interval by at least the time delay. In one example, the UE 115-*b* may monitor for a data message scheduled by the control message during the second transmission time interval that is at least the time delay after receipt of the triggering instance. Additionally or alternatively, the UE 115-*b* may transmit an uplink data message during the second transmission time interval that is at least the time delay after receipt of the triggering instance.

In some cases, the UE 115-*b* may transmit a sidelink data message during the second transmission time interval that is at least the time delay after receipt of the triggering instance. In some cases, the UE 115-*b* may transmit an acknowledgement for the control message during the second transmission time interval that is at least the time delay after receipt of the triggering instance. In some examples, the UE 115-*b* may apply a transmit power control in transmitting a message during the second transmission time interval that is at least the time delay after receipt of the triggering instance, where the transmit power control is based on a power control command included in the triggering instance. The message may include at least one of an uplink message, a downlink message, a sidelink message. In some examples, the UE 115-*b* may monitor for a data message during a second transmission time interval that is at least a minimum time delay after receipt of the triggering instance.

Figure 4:
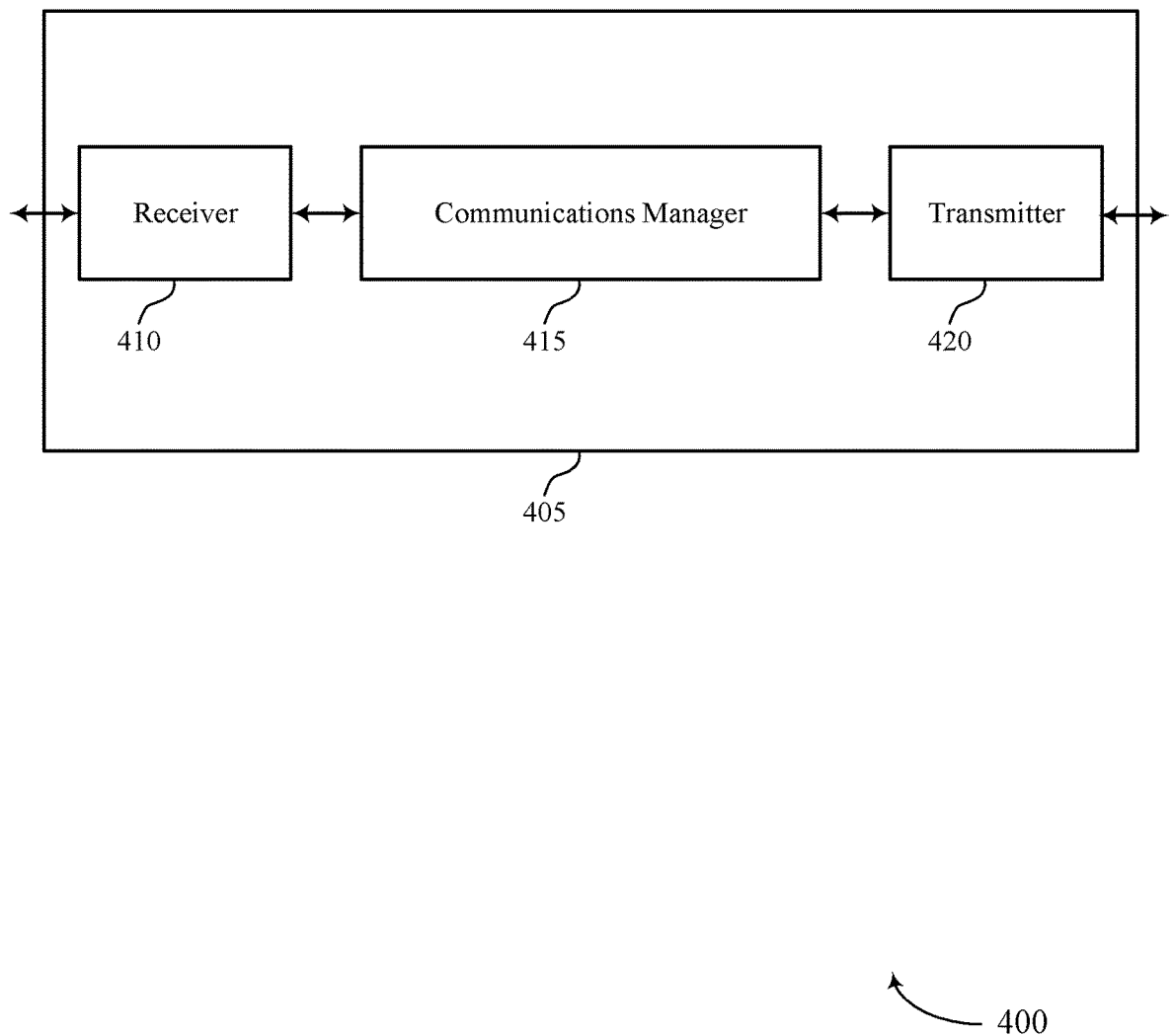
FIGS. 4 and 5 show block diagrams of devices that support delay parameter determination for control message repetition in accordance with aspects of the present disclosure.

FIG. 4 shows a block diagram 400 of a device 405 that supports delay parameter determination for control message repetition in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to delay parameter determination for control message repetition, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a configuration message indicating that transmission of a control message is to be repeated via a set of control message repetitions, identify that a repetition instance of the set of control message repetitions is designated as a triggering instance for a minimum delay parameter, where the minimum delay parameter corresponds to a minimum time delay between the triggering instance and receipt of a data message scheduled by the control message, receive the triggering instance during a first transmission time interval, and monitor for the data message during a second transmission time interval that is at least the minimum time delay after receipt of the triggering instance. The communications manager 415 may also receive, from a base station, a configuration message indicating that transmission of a control message is to be repeated via a set of control message repetitions, receive, from the base station, the triggering instance during a first transmission time interval, identify that a repetition instance of the set of control message repetitions is designated as a triggering instance for a delay parameter, where the delay parameter corresponds to a time delay between the triggering instance and an operation associated with the control message, and perform the operation during a second transmission time interval that is after the first transmission time interval by at least the time delay. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
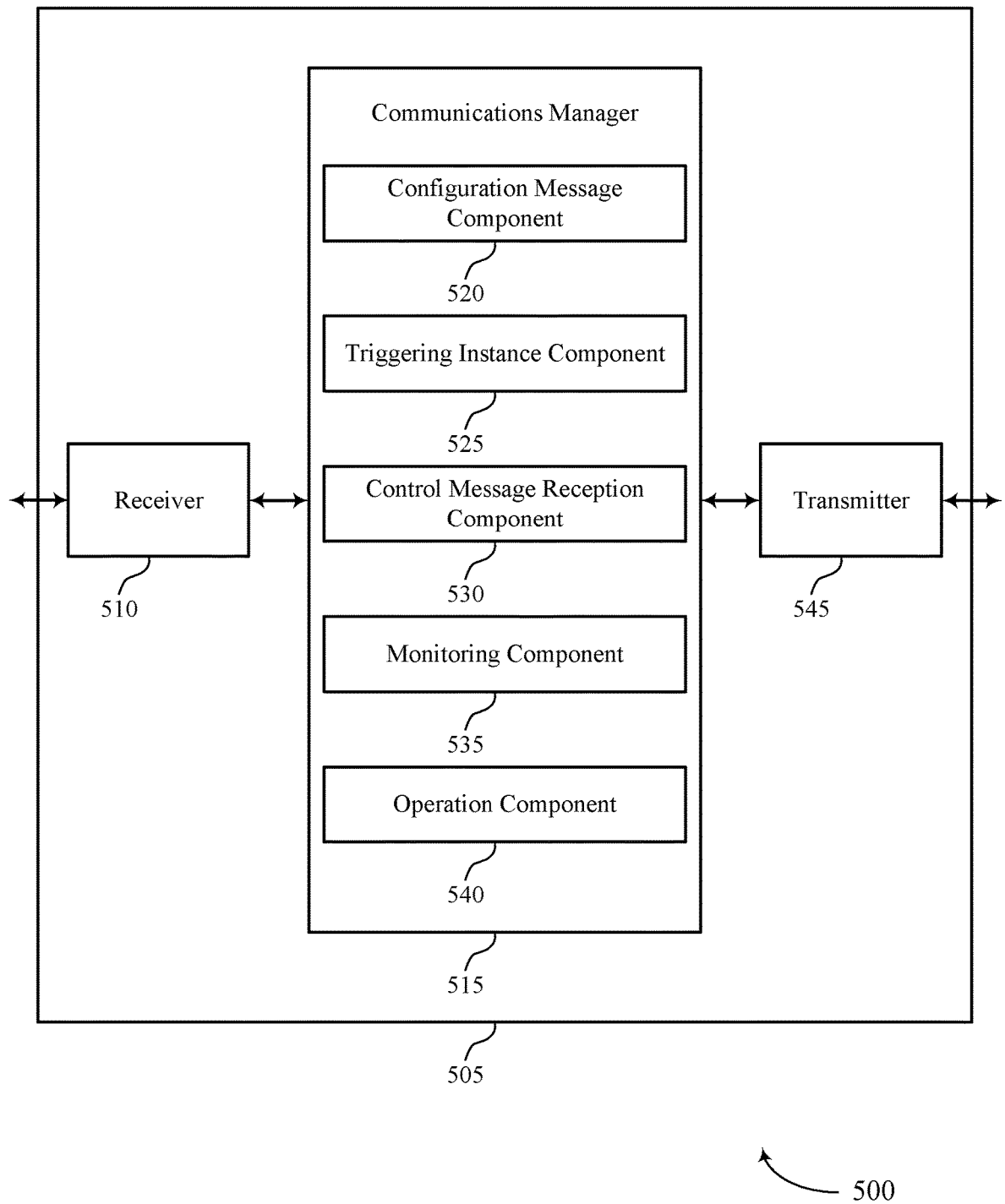

FIG. 5 shows a block diagram 500 of a device 505 that supports delay parameter determination for control message repetition in accordance with aspects of the present disclosure. The device 505 may be an example of aspects of a device 405, or a UE 115 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to delay parameter determination for control message repetition, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configuration message component 520, a triggering instance component 525, a control message reception component 530, a monitoring component 535, and an operation component 540. The communications manager 515 may be an example of aspects of the communications manager 710 described herein.

The configuration message component 520 may receive a configuration message indicating that transmission of a control message is to be repeated via a set of control message repetitions. The triggering instance component 525 may identify that a repetition instance of the set of control message repetitions is designated as a triggering instance for a minimum delay parameter, where the minimum delay parameter corresponds to a minimum time delay between the triggering instance and receipt of a data message scheduled by the control message.

The control message reception component 530 may receive the triggering instance during a first transmission time interval. The monitoring component 535 may monitor for the data message during a second transmission time interval that is at least the minimum time delay after receipt of the triggering instance.

The configuration message component 520 may receive, from a base station, a configuration message indicating that transmission of a control message is to be repeated via a set of control message repetitions and receive, from the base station, the triggering instance during a first transmission time interval. The triggering instance component 525 may identify that a repetition instance of the set of control message repetitions is designated as a triggering instance for a delay parameter, where the delay parameter corresponds to a time delay between the triggering instance and an operation associated with the control message. The operation component 540 may perform the operation during a second transmission time interval that is after the first transmission time interval by at least the time delay.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
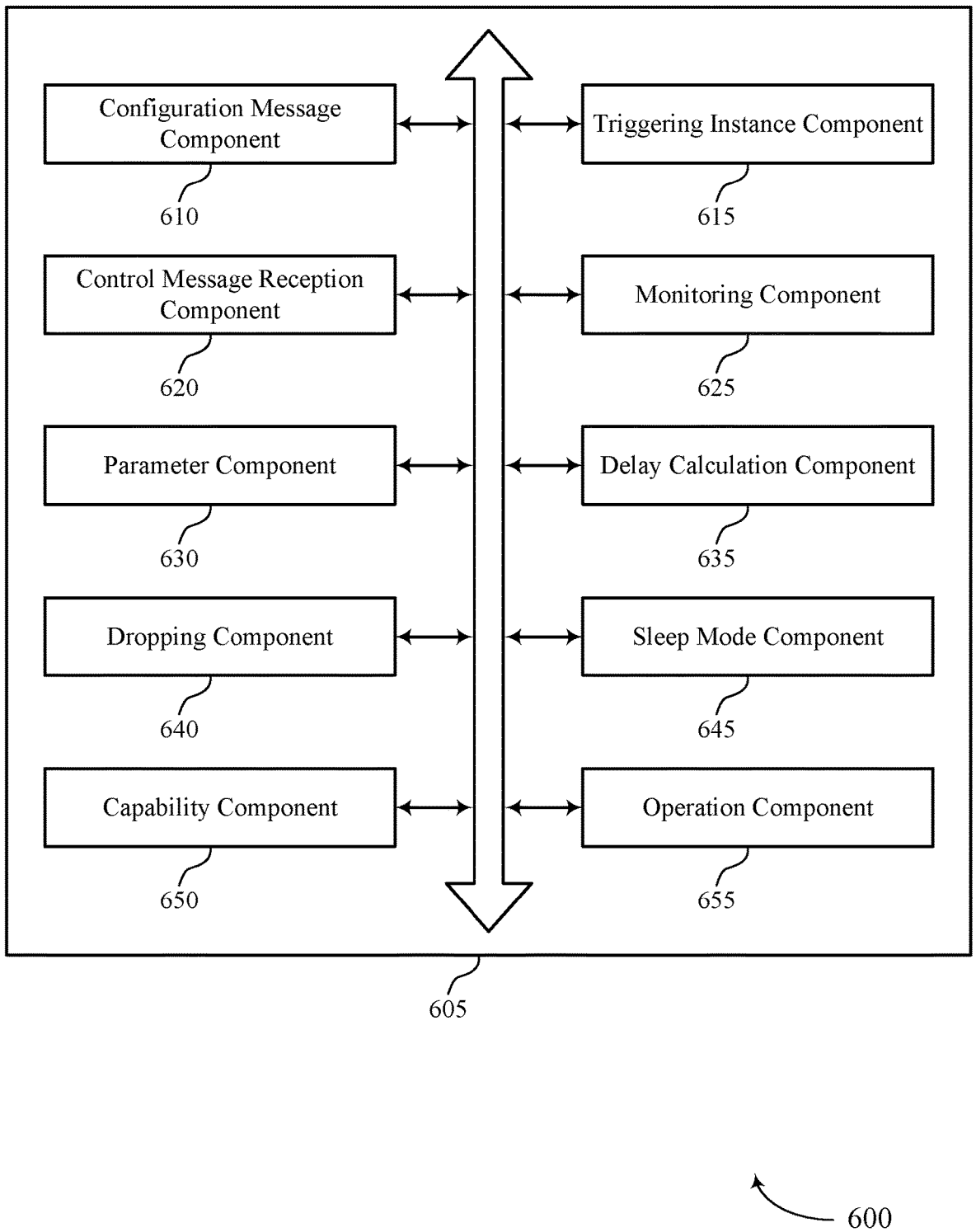
FIG. 6 shows a block diagram of a communications manager that supports delay parameter determination for control message repetition in accordance with aspects of the present disclosure.

FIG. 6 shows a block diagram 600 of a communications manager 605 that supports delay parameter determination for control message repetition in accordance with aspects of the present disclosure. The communications manager 605 may be an example of aspects of a communications manager 415, a communications manager 515, or a communications manager 710 described herein. The communications manager 605 may include a configuration message component 610, a triggering instance component 615, a control message reception component 620, a monitoring component 625, a parameter component 630, a delay calculation component 635, a dropping component 640, a sleep mode component 645, a capability component 650, and an operation component 655. Each of these modules may communicate, directly or indirectly, with one another (e.g., via one or more buses).

The configuration message component 610 may receive a configuration message indicating that transmission of a control message is to be repeated via a set of control message repetitions. In some examples, the configuration message component 610 may receive, from a base station, a configuration message indicating that transmission of a control message is to be repeated via a set of control message repetitions.

In some examples, the configuration message component 610 may receive the triggering instance during a first transmission time interval. In some cases, the control message includes at least one of a physical downlink control channel, a physical sidelink control channel, or a combination thereof.

The triggering instance component 615 may identify that a repetition instance of the set of control message repetitions is designated as a triggering instance for a minimum delay parameter, where the minimum delay parameter corresponds to a minimum time delay between the triggering instance and receipt of a data message scheduled by the control message. In some examples, the triggering instance component 615 may identify that a repetition instance of the set of control message repetitions is designated as a triggering instance for a delay parameter, where the delay parameter corresponds to a time delay between the triggering instance and an operation associated with the control message.

In some examples, the triggering instance component 615 may receive, from a base station, an indication of that the repetition instance of the set of control message repetitions is designated as the triggering instance via at least one of a master information block, a system information block, a radio resource control message, a medium access control (MAC) control element, a downlink control information, or a combination thereof.

In some cases, the triggering instance includes a first repetition of the control message or a last repetition of the control message. In some cases, the triggering instance includes a repetition of the control message included in a subset of a set of configured repetitions of the control message, where the set of configured repetitions of the control message includes a maximum number of repetitions supported by the UE.

In some cases, a value of the minimum delay parameter is based on repetition instance designated as the triggering instance. In some cases, the repetition instance is designated as a triggering instance based on the operation to be performed during the second transmission time interval.

In some cases, the triggering instance includes a first repetition of the control message or a last repetition of the control message. In some cases, the triggering instance includes a repetition of the control message included in a subset of repetitions of the control message, where the subset of repetitions of the control message includes a maximum number of repetitions supported by the UE.

The control message reception component 620 may receive, from a base station, the triggering instance during a first transmission time interval. The monitoring component 625 may monitor for the data message during a second transmission time interval that is at least the minimum time delay after receipt of the triggering instance. The operation component 655 may perform the operation during a second transmission time interval that is after the first transmission time interval by at least the time delay.

In some examples, the operation component 655 may monitor for a data message scheduled by the control message during the second transmission time interval that is at least the time delay after receipt of the triggering instance. In some examples, the operation component 655 may transmit an uplink data message during the second transmission time interval that is at least the time delay after receipt of the triggering instance.

In some examples, the operation component 655 may transmit a sidelink data message during the second transmission time interval that is at least the time delay after receipt of the triggering instance. In some examples, the operation component 655 may transmit an acknowledgement for the control message during the second transmission time interval that is at least the time delay after receipt of the triggering instance.

In some examples, the operation component 655 may apply a transmit power control in transmitting a message during the second transmission time interval that is at least the time delay after receipt of the triggering instance, where the transmit power control is based on a power control command included in the triggering instance. In some examples, the operation component 655 may transmit a random access channel message for the control message during the second transmission time interval that is at least the time delay after receipt of the triggering instance. In some cases, the message includes at least one of an uplink message, a downlink message, a sidelink message, or a combination thereof.

In some examples, the operation component 655 may switch to an updated delay parameter during the second transmission time interval that is at least the time delay after receipt of the triggering instance, where the updated delay parameter corresponds to a minimum time delay between the triggering instance and receipt of a data message scheduled by the control message. In some examples, the operation component 655 may transmit an alert message in response to the control message during the second transmission time interval that is at least the time delay after receipt of the triggering instance. In some cases, the alert message includes at least one of an earthquake and tsunami warning system message, a commercial mobile alert system message, or a combination thereof.

The parameter component 630 may receive a parameter associated with the triggering instance. In some examples, the parameter component 630 may identify the parameter associated with the triggering instance. In some cases, the parameter associated with the triggering instance includes at least one of a starting symbol of the control message, an ending symbol of the control message, a duration of the control message, or a combination thereof.

In some cases, the starting symbol of the control message corresponds to a start of the first transmission time interval and the ending symbol of the control message corresponds to an end of the first transmission time interval. In some cases, the parameter is constant across a set of repetition instances designated as triggering instances. In some cases, the parameter associated with the triggering instance includes at least one of a starting symbol of the control message, an ending symbol of the control message, a duration of the control message, or a combination thereof.

In some cases, the starting symbol of the control message corresponds to a start of the first transmission time interval and the ending symbol of the control message corresponds to an end of the first transmission time interval. In some cases, the parameter is constant across a set of repetition instances designated as triggering instances.

The delay calculation component 635 may calculate the minimum time delay based on the identified parameter associated with the triggering instance. In some examples, the delay calculation component 635 may receive an indication that the time delay is to be calculated based on a parameter associated with the repetition instance designated as the triggering instance. In some examples, the delay calculation component 635 may calculate the time delay based on the identified parameter associated with the triggering instance.

The dropping component 640 may receive an indication to drop a repetition instance. In some examples, the dropping component 640 may determine that the repetition instance to be dropped corresponds to the repetition instance designated as the triggering instance.

In some examples, the dropping component 640 may drop the repetition instance based on receiving the indication. In some examples, the dropping component 640 may designate a subsequent repetition instance as the triggering instance based on dropping the repetition instance.

In some examples, the dropping component 640 may receive an indication to drop a repetition instance. In some examples, the dropping component 640 may determine that the repetition instance to be dropped corresponds to the repetition instance designated as the triggering instance. In some examples, the dropping component 640 may drop the repetition instance based on receiving the indication.

The sleep mode component 645 may initiate a sleep mode after receiving the triggering instance of the control message. In some examples, the sleep mode component 645 may terminate the sleep mode upon expiration of the minimum time delay between the first transmission time interval and the second transmission time interval.

The capability component 650 may transmit, to a base station, a capability of the UE to support a set of minimum delay parameters. In some examples, the capability component 650 may receive, from the base station, an indication of the minimum delay parameter based on the capability of the UE. In some examples, the capability component 650 may receive, from the base station, the indication of the minimum delay parameter via a radio resource control message.

Figure 7:
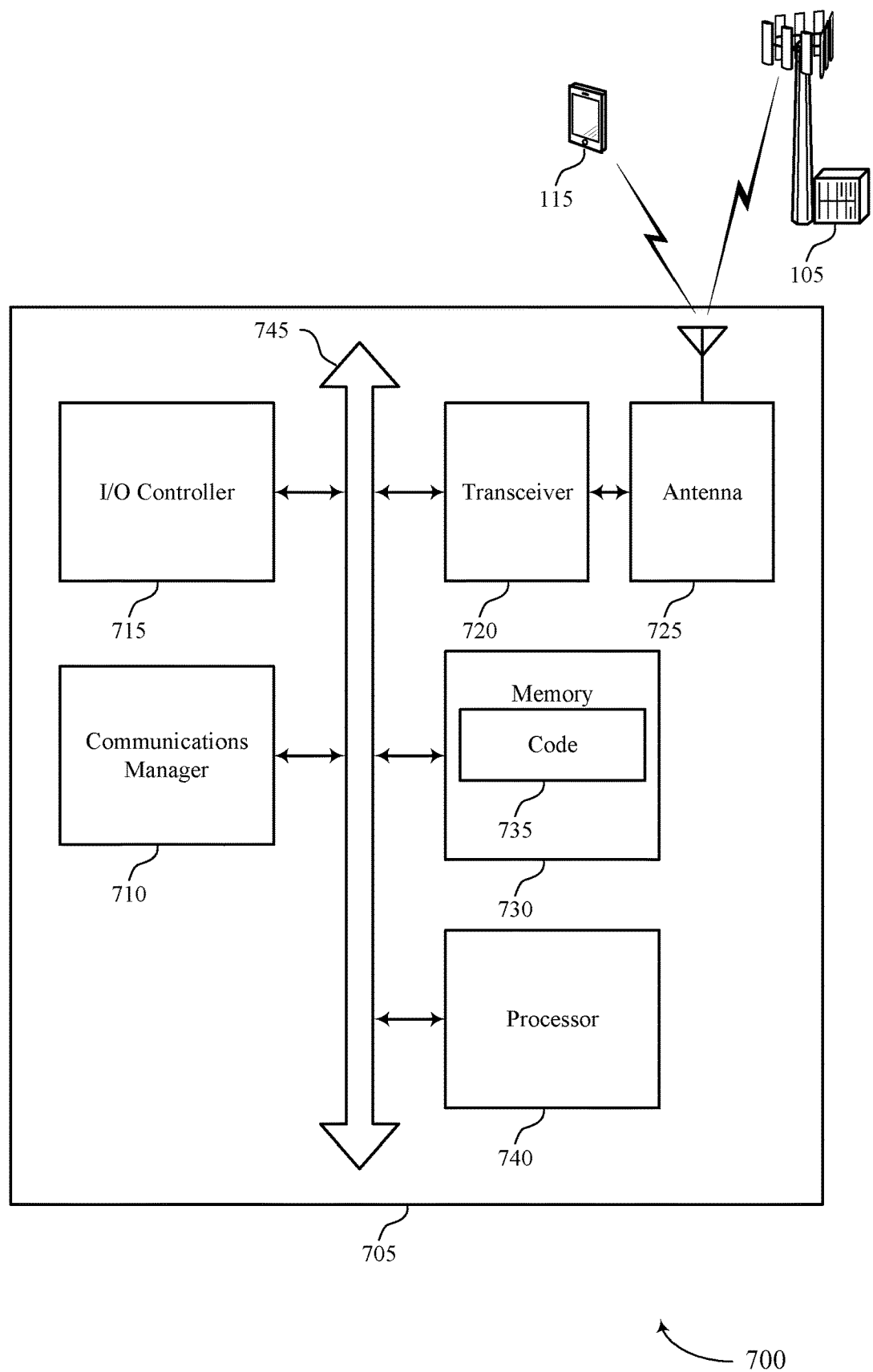
FIG. 7 shows a diagram of a system including a device that supports delay parameter determination for control message repetition in accordance with aspects of the present disclosure.

FIG. 7 shows a diagram of a system 700 including a device 705 that supports delay parameter determination for control message repetition in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a configuration message indicating that transmission of a control message is to be repeated via a set of control message repetitions, identify that a repetition instance of the set of control message repetitions is designated as a triggering instance for a minimum delay parameter, where the minimum delay parameter corresponds to a minimum time delay between the triggering instance and receipt of a data message scheduled by the control message, receive the triggering instance during a first transmission time interval, and monitor for the data message during a second transmission time interval that is at least the minimum time delay after receipt of the triggering instance. The communications manager 710 may also receive, from a base station, a configuration message indicating that transmission of a control message is to be repeated via a set of control message repetitions, receive, from the base station, the triggering instance during a first transmission time interval, identify that a repetition instance of the set of control message repetitions is designated as a triggering instance for a delay parameter, where the delay parameter corresponds to a time delay between the triggering instance and an operation associated with the control message, and perform the operation during a second transmission time interval that is after the first transmission time interval by at least the time delay.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touch-screen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting delay parameter determination for control message repetition).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
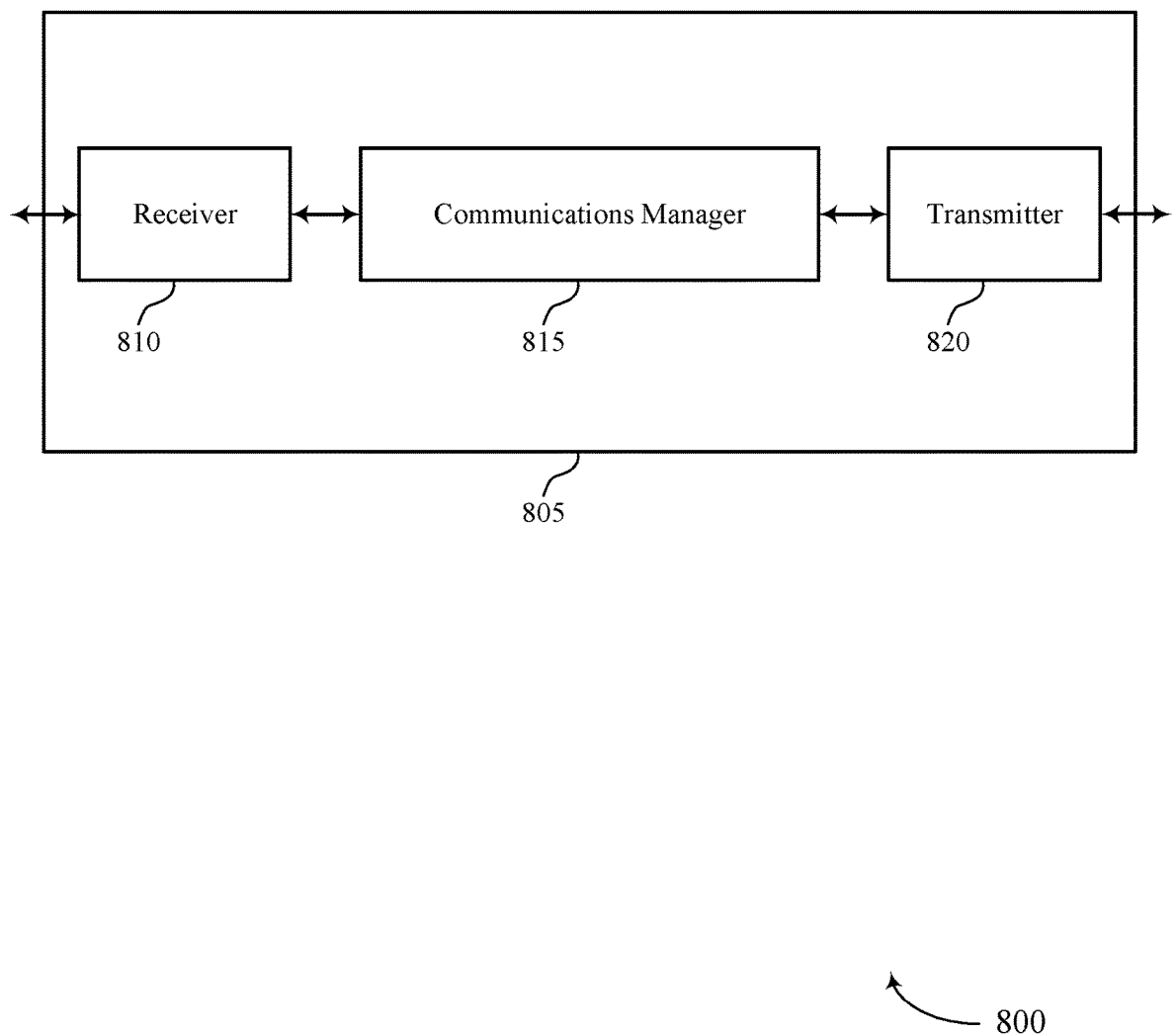
FIGS. 8 and 9 show block diagrams of devices that support delay parameter determination for control message repetition in accordance with aspects of the present disclosure.

FIG. 8 shows a block diagram 800 of a device 805 that supports delay parameter determination for control message repetition in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to delay parameter determination for control message repetition, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, a configuration message indicating that transmission of a control message is to be repeated via a set of control message repetitions, transmit, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message, transmit, to the UE, the triggering instance during a first transmission time interval, and transmit, to the UE, the data message during a second transmission time interval that is at least the minimum time delay after receipt of the triggering instance. The communications manager 815 may also transmit, to a UE, a configuration message indicating that transmission of a control message is to be repeated via a set of control message repetitions, transmit, to the UE, an indication that a repetition instance of the set of control message repetitions is designated as a triggering instance for a delay parameter, where the delay parameter corresponds to a time delay between the triggering instance and an operation associated with the control message, transmit, to the UE, the triggering instance during a first transmission time interval, and perform the operation during a second transmission time interval that is after the first transmission time interval by at least the time delay. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
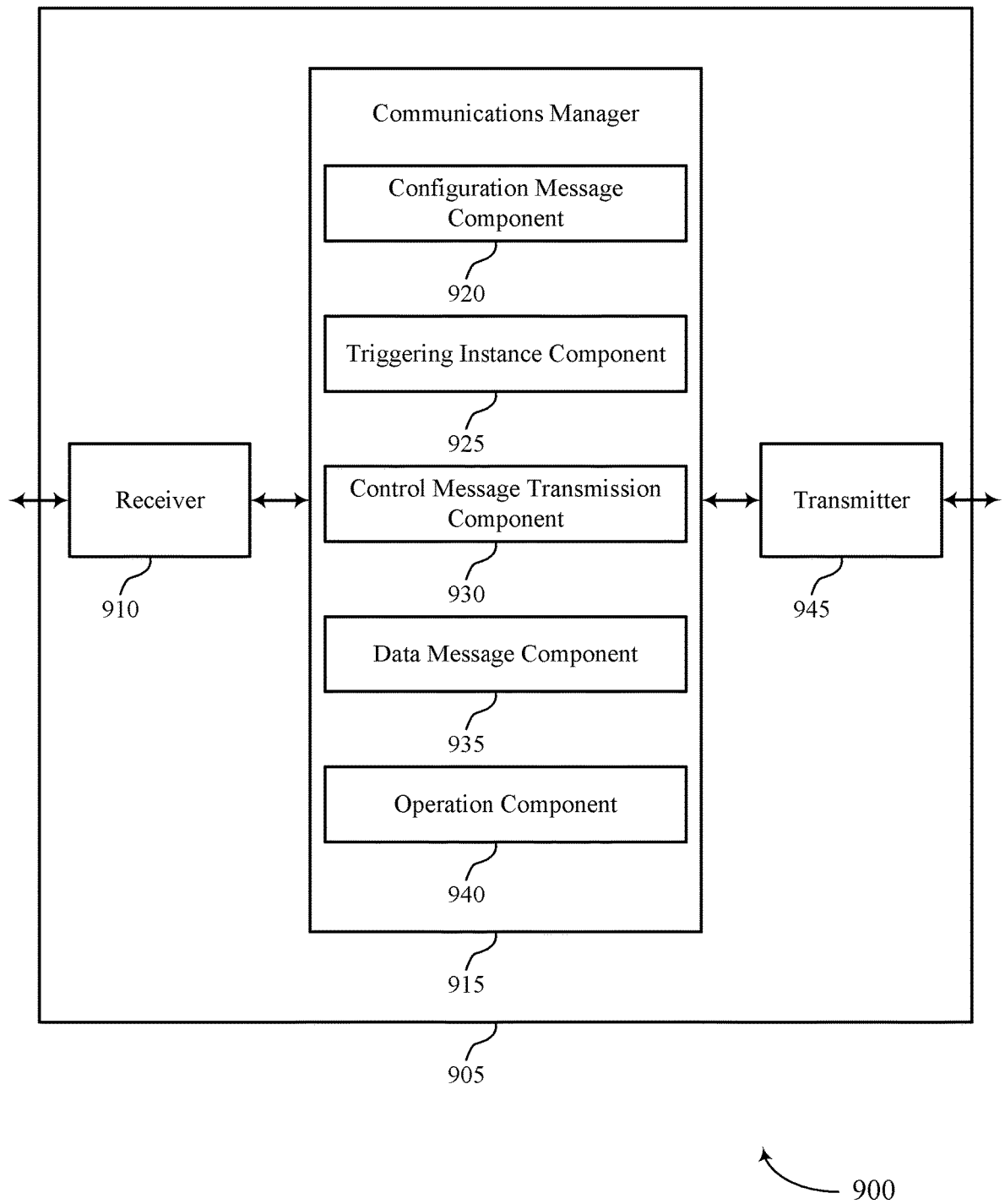

FIG. 9 shows a block diagram 900 of a device 905 that supports delay parameter determination for control message repetition in accordance with aspects of the present disclosure. The device 905 may be an example of aspects of a device 805, or a base station 105 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to delay parameter determination for control message repetition, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration message component 920, a triggering instance component 925, a control message transmission component 930, a data message component 935, and an operation component 940. The communications manager 915 may be an example of aspects of the communications manager 1110 described herein.

The configuration message component 920 may transmit, to a UE, a configuration message indicating that transmission of a control message is to be repeated via a set of control message repetitions. The triggering instance component 925 may transmit, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message.

The control message transmission component 930 may transmit, to the UE, the triggering instance during a first transmission time interval. The data message component 935 may transmit, to the UE, the data message during a second transmission time interval that is at least the minimum time delay after receipt of the triggering instance.

The configuration message component 920 may transmit, to a UE, a configuration message indicating that transmission of a control message is to be repeated via a set of control message repetitions. The triggering instance component 925 may transmit, to the UE, an indication that a repetition instance of the set of control message repetitions is designated as a triggering instance for a delay parameter, where the delay parameter corresponds to a time delay between the triggering instance and an operation associated with the control message.

The control message transmission component 930 may transmit, to the UE, the triggering instance during a first transmission time interval. The operation component 940 may perform the operation during a second transmission time interval that is after the first transmission time interval by at least the time delay.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
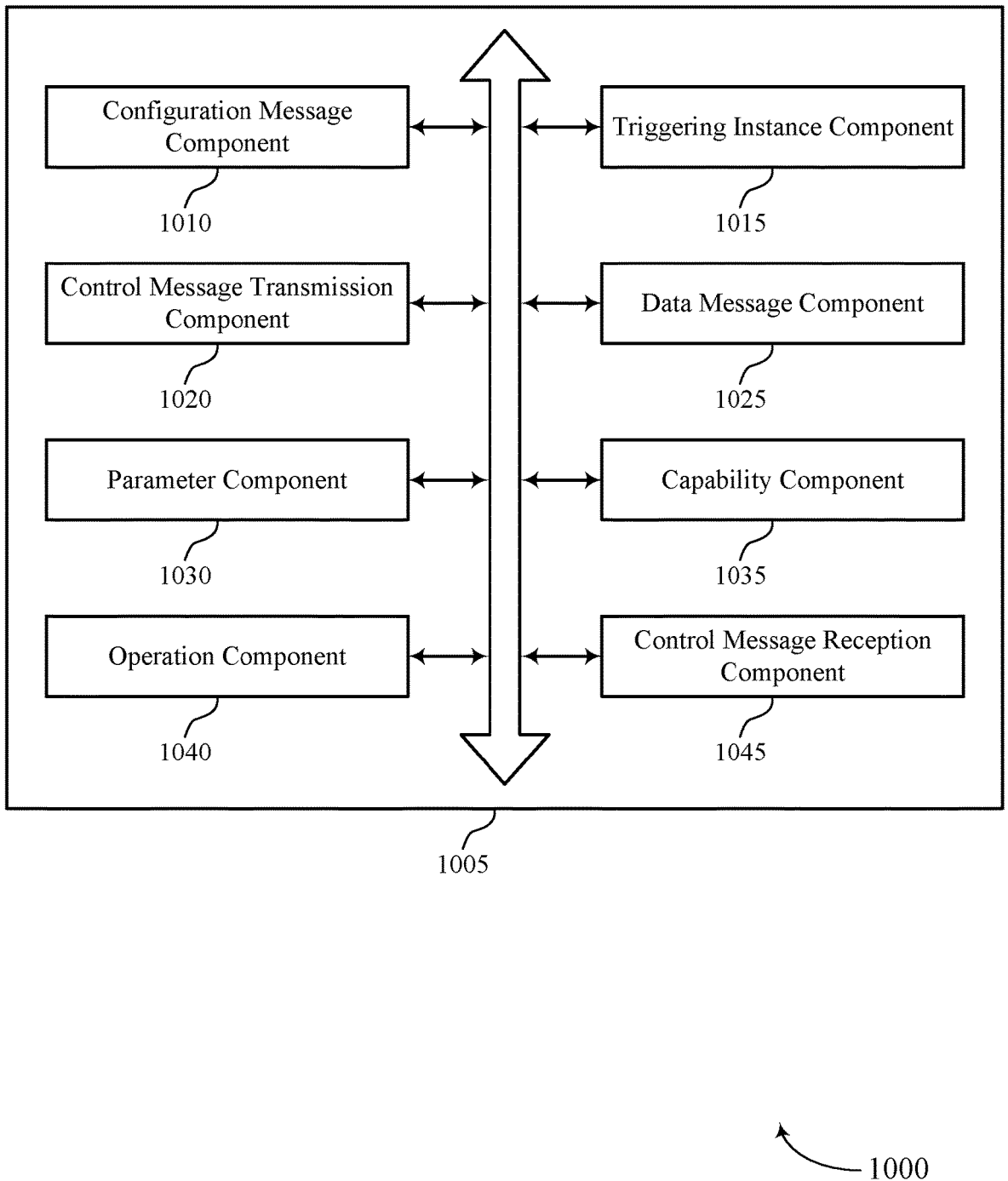
FIG. 10 shows a block diagram of a communications manager that supports delay parameter determination for control message repetition in accordance with aspects of the present disclosure.

FIG. 10 shows a block diagram 1000 of a communications manager 1005 that supports delay parameter determination for control message repetition in accordance with aspects of the present disclosure. The communications manager 1005 may be an example of aspects of a communications manager 815, a communications manager 915, or a communications manager 1110 described herein. The communications manager 1005 may include a configuration message component 1010, a triggering instance component 1015, a control message transmission component 1020, a data message component 1025, a parameter component 1030, a capability component 1035, an operation component 1040, and a control message reception component 1045. Each of these modules may communicate, directly or indirectly, with one another (e.g., via one or more buses).

The configuration message component 1010 may transmit, to a UE, a configuration message indicating that transmission of a control message is to be repeated via a set of control message repetitions. In some examples, the configuration message component 1010 may transmit, to a UE, a configuration message indicating that transmission of a control message is to be repeated via a set of control message repetitions. In some cases, the control message includes at least one of a physical downlink control channel, a physical sidelink control channel, or a combination thereof.

The triggering instance component 1015 may transmit, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message. In some examples, the triggering instance component 1015 may transmit, to the UE, an indication that a repetition instance of the set of control message repetitions is designated as a triggering instance for a delay parameter, where the delay parameter corresponds to a time delay between the triggering instance and an operation associated with the control message.

In some examples, the triggering instance component 1015 may transmit, to the UE, the indication of that the repetition instance of the set of control message repetitions is designated as the triggering instance via at least one of a master information block, a system information block, a radio resource control message, a medium access control (MAC) control element, a downlink control information, or a combination thereof.

In some examples, the triggering instance component 1015 may transmit, to the UE, the indication of the minimum delay parameter via a radio resource control message. In some cases, the triggering instance includes a first repetition of the control message or a last repetition of the control message.

In some cases, the triggering instance includes a repetition of the control message included in a subset of a set of configured repetitions of the control message, where the set of configured repetitions of the control message includes a maximum number of repetitions supported by the UE. In some cases, a value of the minimum delay parameter is based on repetition instance designated as the triggering instance.

In some cases, the repetition instance is designated as a triggering instance based on the operation to be performed during the second transmission time interval. In some cases, the triggering instance includes a first repetition of the control message or a last repetition of the control message.

In some cases, the triggering instance includes a repetition of the control message included in a subset of repetitions of the control message, where the subset of repetitions of the control message includes a maximum number of repetitions supported by the UE.

The control message transmission component 1020 may transmit, to the UE, the triggering instance during a first transmission time interval. In some examples, the control message transmission component 1020 may transmit, to the UE, the triggering instance during a first transmission time interval.

The data message component 1025 may transmit, to the UE, the data message during a second transmission time interval that is at least the minimum time delay after receipt of the triggering instance. The operation component 1040 may perform the operation during a second transmission time interval that is after the first transmission time interval by at least the time delay.

In some examples, the operation component 1040 may transmit a data message scheduled by the control message during the second transmission time interval that is at least the time delay after receipt of the triggering instance. In some examples, the operation component 1040 may receive an uplink data message during the second transmission time interval that is at least the time delay after receipt of the triggering instance.

In some examples, the operation component 1040 may receive an acknowledgement for the control message during the second transmission time interval that is at least the time delay after receipt of the triggering instance. In some examples, the operation component 1040 may receive a random access channel message for the control message during the second transmission time interval that is at least the time delay after receipt of the triggering instance.

The parameter component 1030 may configure the UE to calculate the minimum time delay based on a parameter associated with the repetition instance designated as the triggering instance. In some examples, the parameter component 1030 may configure the UE to calculate the time delay based on a parameter associated with the repetition instance designated as the triggering instance.

In some cases, the parameter associated with the triggering instance includes at least one of a starting symbol of the control message, an ending symbol of the control message, a duration of the control message, or a combination thereof. In some cases, the starting symbol of the control message corresponds to a start of the first transmission time interval and the ending symbol of the control message corresponds to an end of the first transmission time interval.

In some cases, the starting symbol of the control message and the ending symbol of the control message each correspond to specific symbols of the first transmission time interval, where the specific symbols are either predetermined or are indicated to the UE by the base station. In some cases, the parameter is constant across a set of repetition instances designated as triggering instances.

In some cases, the parameter associated with the triggering instance includes at least one of a starting symbol of the control message, an ending symbol of the control message, a duration of the control message, or a combination thereof. In some cases, the starting symbol of the control message corresponds to a start of the first transmission time interval and the ending symbol of the control message corresponds to an end of the first transmission time interval. In some cases, the parameter is constant across a set of repetition instances designated as triggering instances.

The capability component 1035 may receive, from the UE, a capability of the UE to support a set of minimum delay parameters. In some examples, the capability component 1035 may transmit, to the UE, an indication of the minimum delay parameter based on the capability of the UE.

The control message reception component 1045 may identify reception of one or more control messages. In some cases, the control message includes at least one of a physical downlink control channel, a physical sidelink control channel, or a combination thereof.

Figure 11:
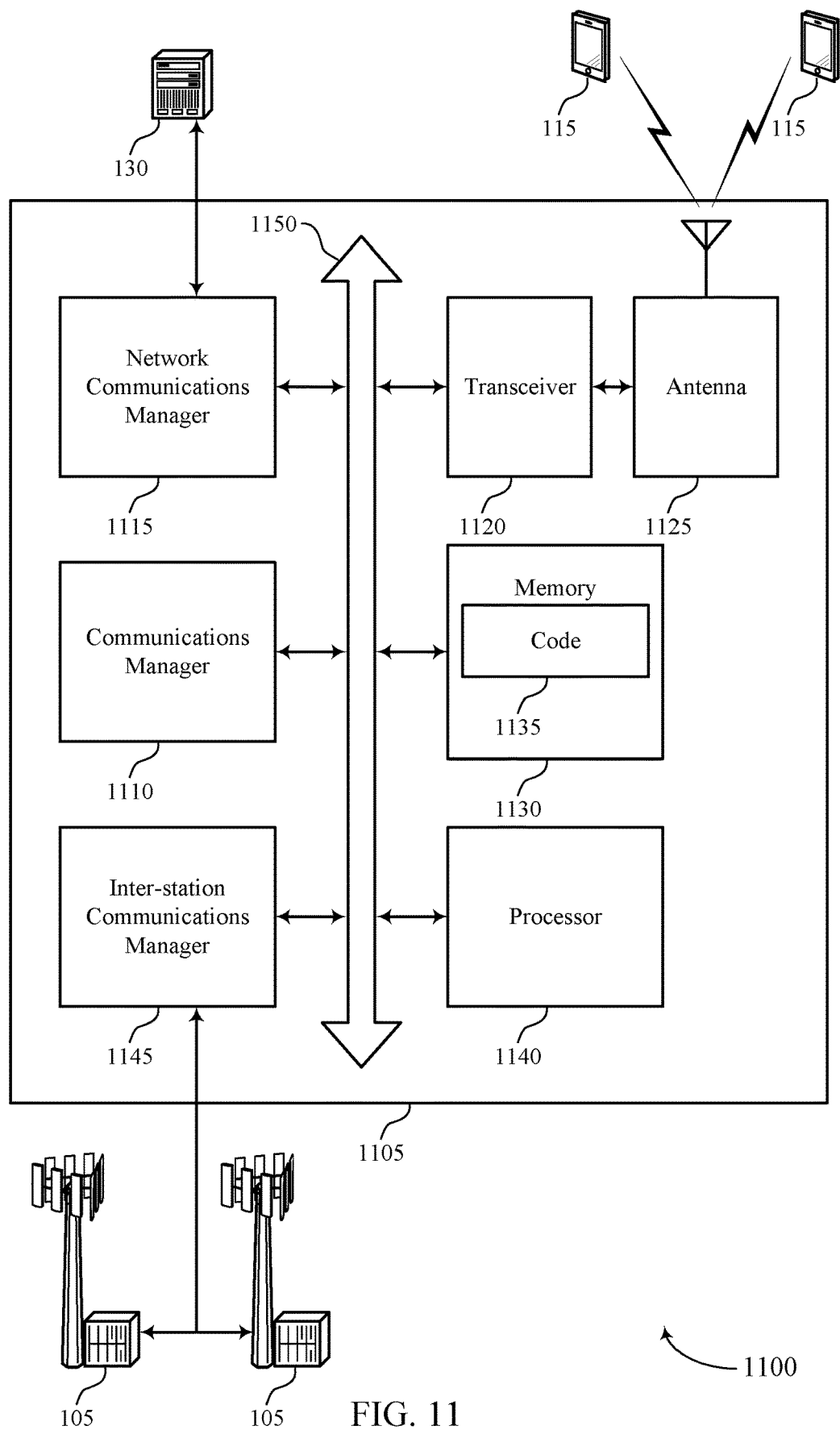
FIG. 11 shows a diagram of a system including a device that supports delay parameter determination for control message repetition in accordance with aspects of the present disclosure.

FIG. 11 shows a diagram of a system 1100 including a device 1105 that supports delay parameter determination for control message repetition in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, a configuration message indicating that transmission of a control message is to be repeated via a set of control message repetitions, transmit, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message, transmit, to the UE, the triggering instance during a first transmission time interval, and transmit, to the UE, the data message during a second transmission time interval that is at least the minimum time delay after receipt of the triggering instance. The communications manager 1110 may also transmit, to a UE, a configuration message indicating that transmission of a control message is to be repeated via a set of control message repetitions, transmit, to the UE, an indication that a repetition instance of the set of control message repetitions is designated as a triggering instance for a delay parameter, where the delay parameter corresponds to a time delay between the triggering instance and an operation associated with the control message, transmit, to the UE, the triggering instance during a first transmission time interval, and perform the operation during a second transmission time interval that is after the first transmission time interval by at least the time delay.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting delay parameter determination for control message repetition).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
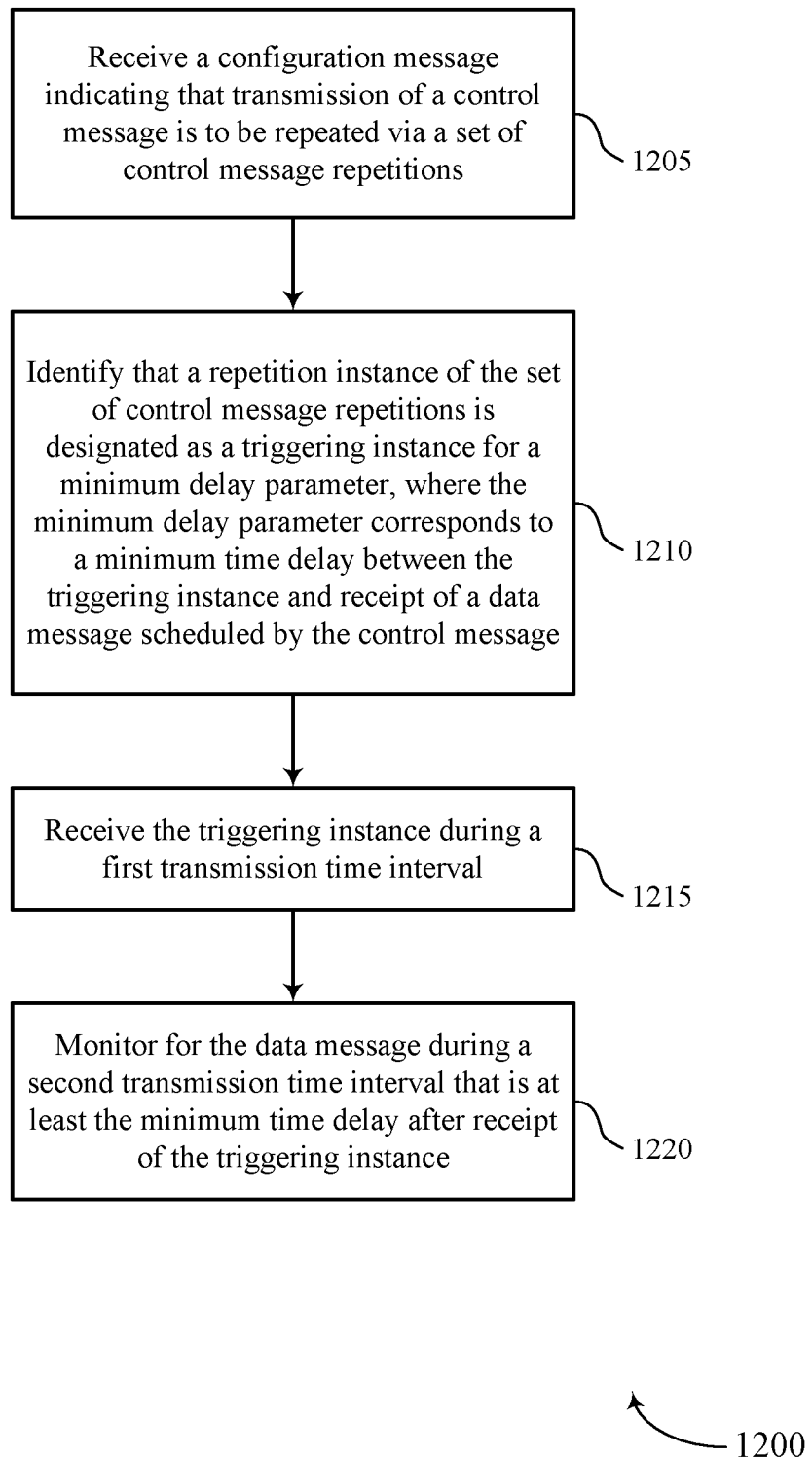
FIGS. 12 through 15 show flowcharts illustrating methods that support delay parameter determination for control message repetition in accordance with aspects of the present disclosure.

FIG. 12 shows a flowchart illustrating a method 1200 that supports delay parameter determination for control message repetition in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive a configuration message indicating that transmission of a control message is to be repeated via a set of control message repetitions. The operations of 1205 may be performed according to the methods described herein. In some examples, aspects of the operations of 1205 may be performed by a configuration message component as described with reference to FIGS. 4 through 7.

At 1210, the UE may identify that a repetition instance of the set of control message repetitions is designated as a triggering instance for a minimum delay parameter, where the minimum delay parameter corresponds to a minimum time delay between the triggering instance and receipt of a data message scheduled by the control message. The operations of 1210 may be performed according to the methods described herein. In some examples, aspects of the operations of 1210 may be performed by a triggering instance component as described with reference to FIGS. 4 through 7.

At 1215, the UE may receive the triggering instance during a first transmission time interval. The operations of 1215 may be performed according to the methods described herein. In some examples, aspects of the operations of 1215 may be performed by a control message reception component as described with reference to FIGS. 4 through 7.

At 1220, the UE may monitor for the data message during a second transmission time interval that is at least the minimum time delay after receipt of the triggering instance. The operations of 1220 may be performed according to the methods described herein. In some examples, aspects of the operations of 1220 may be performed by a monitoring component as described with reference to FIGS. 4 through 7.

Figure 13:
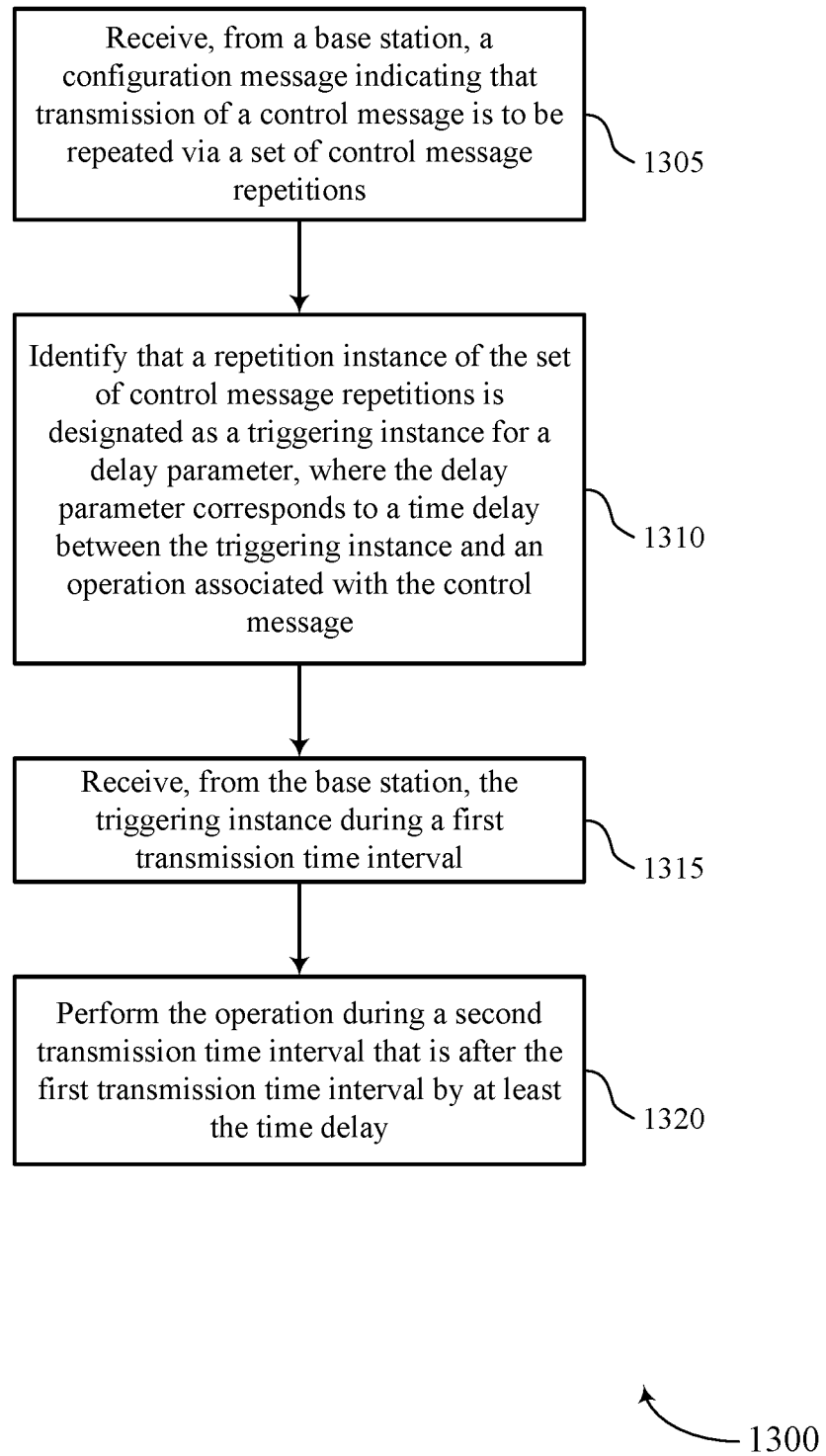

FIG. 13 shows a flowchart illustrating a method 1300 that supports delay parameter determination for control message repetition in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a configuration message indicating that transmission of a control message is to be repeated via a set of control message repetitions. The operations of 1305 may be performed according to the methods described herein. In some examples, aspects of the operations of 1305 may be performed by a configuration message component as described with reference to FIGS. 4 through 7.

At 1310, the UE may identify that a repetition instance of the set of control message repetitions is designated as a triggering instance for a delay parameter, where the delay parameter corresponds to a time delay between the triggering instance and an operation associated with the control message. The operations of 1310 may be performed according to the methods described herein. In some examples, aspects of the operations of 1310 may be performed by a triggering instance component as described with reference to FIGS. 4 through 7.

At 1315, the UE may receive, from the base station, the triggering instance during a first transmission time interval. The operations of 1315 may be performed according to the methods described herein. In some examples, aspects of the operations of 1315 may be performed by a configuration message component as described with reference to FIGS. 4 through 7.

At 1320, the UE may perform the operation during a second transmission time interval that is after the first transmission time interval by at least the time delay. The operations of 1320 may be performed according to the methods described herein. In some examples, aspects of the operations of 1320 may be performed by an operation component as described with reference to FIGS. 4 through 7.

Figure 14:
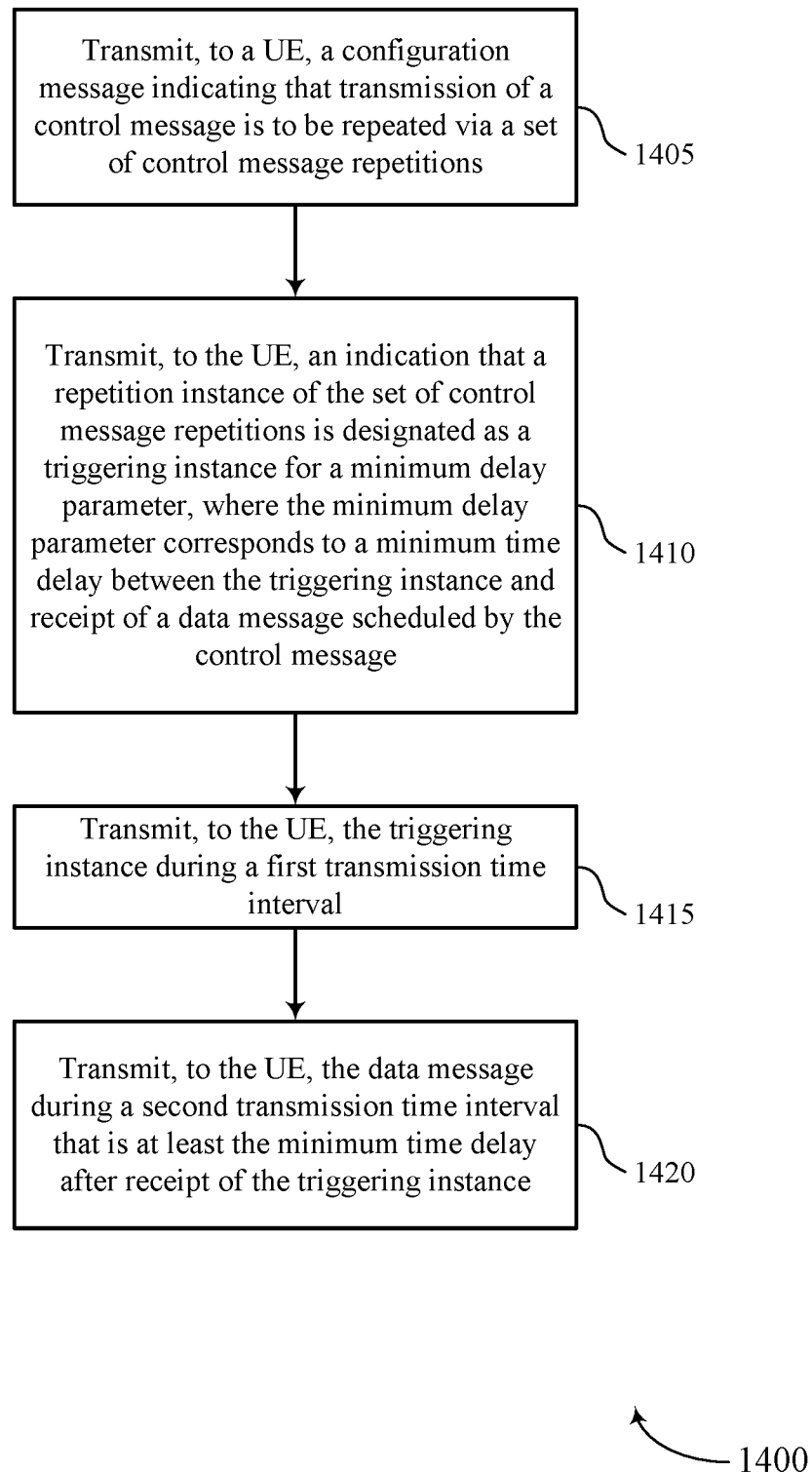

FIG. 14 shows a flowchart illustrating a method 1400 that supports delay parameter determination for control message repetition in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may transmit, to a UE, a configuration message indicating that transmission of a control message is to be repeated via a set of control message repetitions. The operations of 1405 may be performed according to the methods described herein. In some examples, aspects of the operations of 1405 may be performed by a configuration message component as described with reference to FIGS. 8 through 11.

At 1410, the base station may transmit, to the UE, an indication that a repetition instance of the set of control message repetitions is designated as a triggering instance for a minimum delay parameter, where the minimum delay parameter corresponds to a minimum time delay between the triggering instance and receipt of a data message scheduled by the control message. The operations of 1410 may be performed according to the methods described herein. In some examples, aspects of the operations of 1410 may be performed by a triggering instance component as described with reference to FIGS. 8 through 11.

At 1415, the base station may transmit, to the UE, the triggering instance during a first transmission time interval. The operations of 1415 may be performed according to the methods described herein. In some examples, aspects of the operations of 1415 may be performed by a control message transmission component as described with reference to FIGS. 8 through 11.

At 1420, the base station may transmit, to the UE, the data message during a second transmission time interval that is at least the minimum time delay after receipt of the triggering instance. The operations of 1420 may be performed according to the methods described herein. In some examples, aspects of the operations of 1420 may be performed by a data message component as described with reference to FIGS. 8 through 11.

Figure 15:
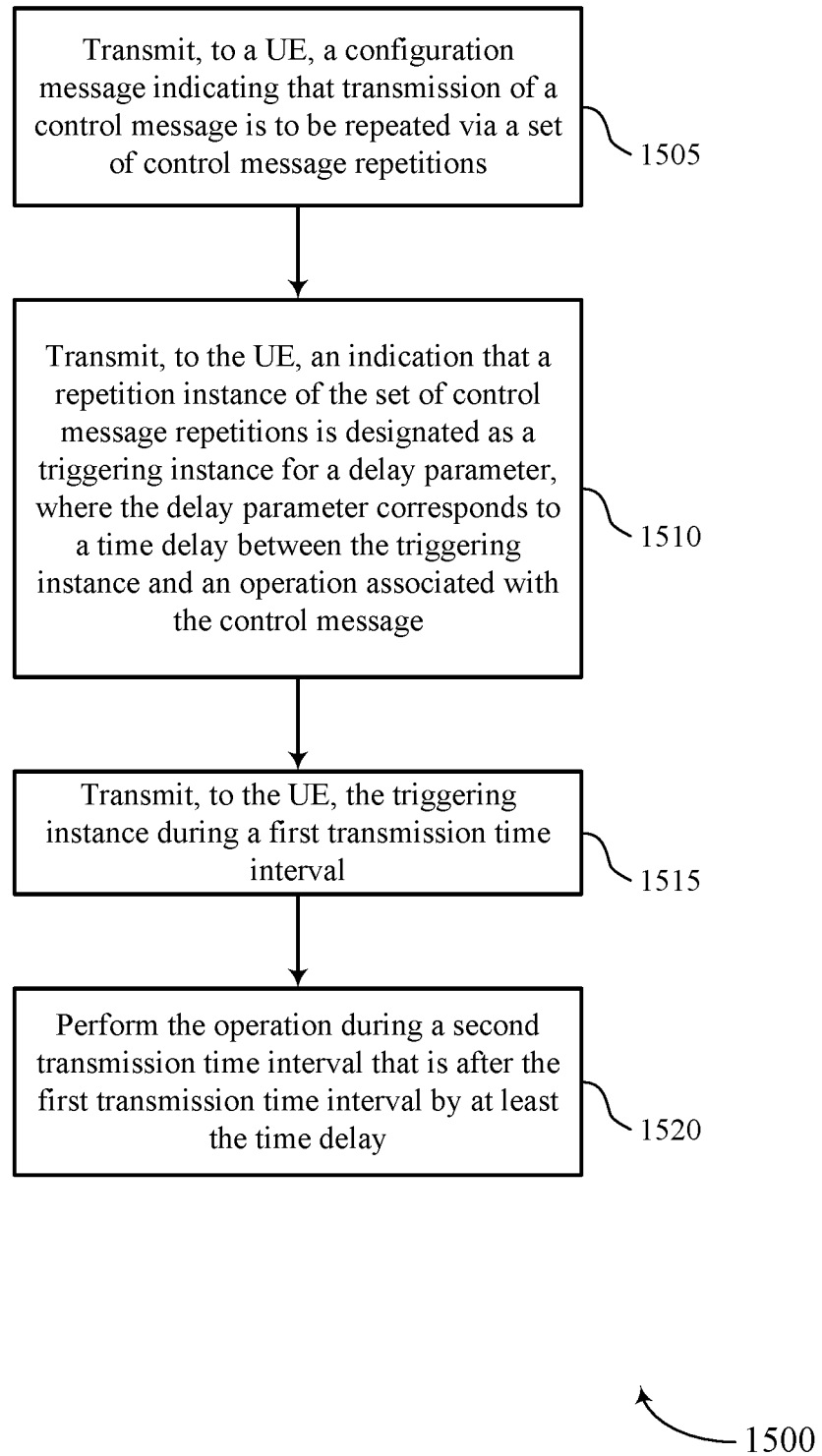

FIG. 15 shows a flowchart illustrating a method 1500 that supports delay parameter determination for control message repetition in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE, a configuration message indicating that transmission of a control message is to be repeated via a set of control message repetitions. The operations of 1505 may be performed according to the methods described herein. In some examples, aspects of the operations of 1505 may be performed by a configuration message component as described with reference to FIGS. 8 through 11.

At 1510, the base station may transmit, to the UE, an indication that a repetition instance of the set of control message repetitions is designated as a triggering instance for a delay parameter, where the delay parameter corresponds to a time delay between the triggering instance and an operation associated with the control message. The operations of 1510 may be performed according to the methods described herein. In some examples, aspects of the operations of 1510 may be performed by a triggering instance component as described with reference to FIGS. 8 through 11.

At 1515, the base station may transmit, to the UE, the triggering instance during a first transmission time interval. The operations of 1515 may be performed according to the methods described herein. In some examples, aspects of the operations of 1515 may be performed by a control message transmission component as described with reference to FIGS. 8 through 11.

At 1520, the base station may perform the operation during a second transmission time interval that is after the first transmission time interval by at least the time delay. The operations of 1520 may be performed according to the methods described herein. In some examples, aspects of the operations of 1520 may be performed by an operation component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Aspect 1: A method of wireless communication at a UE, comprising: receiving a configuration message indicating that transmission of a control message is to be repeated via a set of control message repetitions; identifying that a repetition instance of the set of control message repetitions is designated as a triggering instance for a minimum delay parameter, wherein the minimum delay parameter corresponds to a minimum time delay between the triggering instance and receipt of a data message scheduled by the control message; receiving the triggering instance during a first transmission time interval; and monitoring for the data message during a second transmission time interval that is at least the minimum time delay after receipt of the triggering instance.

Aspect 2: The method of example 1, wherein the triggering instance comprises a first repetition of the control message or a last repetition of the control message p.

Aspect 3: The method of any of aspects 1 or 2, wherein the triggering instance comprises a repetition of the control message included in a subset of a set of configured repetitions of the control message, wherein the set of configured repetitions of the control message comprises a maximum number of repetitions supported by the UE.

Aspect 4: The method of any of aspects 1 to 3, further comprising: receiving a parameter associated with the triggering instance; and calculating the minimum time delay based at least in part on the identified parameter associated with the triggering instance.

Aspect 5: The method of any of aspects 1 to 4, wherein the parameter associated with the triggering instance comprises at least one of a starting symbol of the control message, an ending symbol of the control message, a duration of the control message, or a combination thereof.

Aspect 6: The method of any of aspects 1 to 5, wherein the starting symbol of the control message corresponds to a start of the first transmission time interval and the ending symbol of the control message corresponds to an end of the first transmission time interval.

Aspect 7: The method of any of aspects 1 to 6, wherein the starting symbol of the control message and the ending symbol of the control message each correspond to specific symbols of the first transmission time interval, wherein the specific symbols are either predetermined or are indicated to the UE by a base station.

Aspect 8: The method of any of aspects 1 to 7, wherein the parameter is constant across a plurality of repetition instances designated as triggering instances.

Aspect 9: The method of any of aspects 1 to 8, further comprising: receiving an indication to drop a repetition instance; determining that the repetition instance to be dropped corresponds to the repetition instance designated as the triggering instance; and dropping the repetition instance based at least in part on receiving the indication.

Aspect 10: The method of any of aspects 1 to 9, further comprising: designating a subsequent repetition instance as the triggering instance based at least in part on dropping the repetition instance.

Aspect 11: The method of any of aspects 1 to 10, further comprising: initiating a sleep mode after receiving the triggering instance of the control message; and terminating the sleep mode upon expiration of the minimum time delay between the first transmission time interval and the second transmission time interval.

Aspect 12: The method of any of aspects 1 to 11, further comprising: transmitting, to a base station, a capability of the UE to support a plurality of minimum delay parameters; and receiving, from the base station, an indication of the minimum delay parameter based at least in part on the capability of the UE.

Aspect 13: The method of any of aspects 1 to 12, wherein receiving the indication of the minimum delay parameter further comprises: receiving, from the base station, the indication of the minimum delay parameter via a radio resource control message.

Aspect 14: The method of any of aspects 1 to 13, wherein identifying that the repetition instance of the set of control message repetitions is designated as the triggering instance further comprises: receiving, from a base station, an indication of that the repetition instance of the set of control message repetitions is designated as the triggering instance via at least one of a master information block, a system information block, a radio resource control message, a medium access control (MAC) control element, a downlink control information, or a combination thereof.

Aspect 15: The method of any of aspects 1 to 14, wherein a value of the minimum delay parameter is based at least in part on repetition instance designated as the triggering instance.

Aspect 16: The method of any of aspects 1 to 15, wherein the control message comprises at least one of a physical downlink control channel, a physical sidelink control channel, or a combination thereof.

Aspect 17: A method of wireless communication at a UE, comprising: receiving, from a base station, a configuration message indicating that transmission of a control message is to be repeated via a set of control message repetitions; identifying that a repetition instance of the set of control message repetitions is designated as a triggering instance for a delay parameter, wherein the delay parameter corresponds to a time delay between the triggering instance and an operation associated with the control message; receiving, from the base station, the triggering instance during a first transmission time interval; and performing the operation during a second transmission time interval that is after the first transmission time interval by at least the time delay.

Aspect 18: The method of aspect 17, wherein performing the operation further comprises: monitoring for a data message scheduled by the control message during the second transmission time interval that is at least the time delay after receipt of the triggering instance.

Aspect 19: The method of any of aspects 17 or 18, wherein performing the operation further comprises: transmitting an uplink data message during the second transmission time interval that is at least the time delay after receipt of the triggering instance.

Aspect 20: The method of any of aspects 17 to 19, wherein performing the operation further comprises: transmitting a sidelink data message during the second transmission time interval that is at least the time delay after receipt of the triggering instance.

Aspect 21: The method of any of aspects 17 to 20, wherein performing the operation further comprises: transmitting an acknowledgement for the control message during the second transmission time interval that is at least the time delay after receipt of the triggering instance.

Aspect 22: The method of any of aspects 17 to 21, wherein performing the operation further comprises: applying a transmit power control in transmitting a message during the second transmission time interval that is at least the time delay after receipt of the triggering instance, wherein the transmit power control is based at least in part on a power control command included in the triggering instance.

Aspect 23: The method of any of aspects 17 to 22, wherein the message comprises at least one of an uplink message, a downlink message, a sidelink message, or a combination thereof.

Aspect 24: The method of any of aspects 17 to 23, wherein performing the operation further comprises: transmitting a random access channel message for the control message during the second transmission time interval that is at least the time delay after receipt of the triggering instance.

Aspect 25: The method of any of aspects 17 to 24, wherein performing the operation further comprises: switching to an updated delay parameter during the second transmission time interval that is at least the time delay after receipt of the triggering instance, wherein the updated delay parameter corresponds to a minimum time delay between the triggering instance and receipt of a data message scheduled by the control message.

Aspect 26: The method of any of aspects 17 to 25, wherein performing the operation further comprises: transmitting an alert message in response to the control message during the second transmission time interval that is at least the time delay after receipt of the triggering instance.

Aspect 27: The method of any of aspects 17 to 26, wherein the alert message comprises at least one of an earthquake and tsunami warning system message, a commercial mobile alert system message, or a combination thereof.

Aspect 28: The method of any of aspects 17 to 27, further comprising: receiving an indication that the time delay is to be calculated based at least in part on a parameter associated with the repetition instance designated as the triggering instance.

Aspect 29: The method of any of aspects 17 to 28, further comprising: identifying the parameter associated with the triggering instance; and calculating the time delay based at least in part on the identified parameter associated with the triggering instance.

Aspect 30: The method of any of aspects 17 to 29, wherein the parameter associated with the triggering instance comprises at least one of a starting symbol of the control message, an ending symbol of the control message, a duration of the control message, or a combination thereof.

Aspect 31: The method of any of aspects 17 to 30, wherein the starting symbol of the control message corresponds to a start of the first transmission time interval and the ending symbol of the control message corresponds to an end of the first transmission time interval.

Aspect 32: The method of any of aspects 17 to 31, wherein the parameter is constant across a plurality of repetition instances designated as triggering instances.

Aspect 33: The method of any of aspects 17 to 32, further comprising: receiving an indication to drop a repetition instance; determining that the repetition instance to be dropped corresponds to the repetition instance designated as the triggering instance; and dropping the repetition instance based at least in part on receiving the indication.

Aspect 34: The method of any of aspects 17 to 33, wherein identifying that the repetition instance of the set of control message repetitions is designated as the triggering instance further comprises: receiving, from the base station, an indication of that the repetition instance of the set of control message repetitions is designated as the triggering instance via at least one of a master information block, a system information block, a radio resource control message, a medium access control (MAC) control element, a downlink control information, or a combination thereof.

Aspect 35: The method of any of aspects 17 to 34, wherein the repetition instance is designated as a triggering instance based at least in part on the operation to be performed during the second transmission time interval.

Aspect 36: The method of any of aspects 17 to 35, wherein a value of the delay parameter is based at least in part on repetition instance designated as the triggering instance.

Aspect 37: The method of any of aspects 17 to 36, wherein the triggering instance comprises a first repetition of the control message or a last repetition of the control message.

Aspect 38: The method of any of aspects 17 to 37, wherein the triggering instance comprises a repetition of the control message included in a subset of repetitions of the control message, wherein the subset of repetitions of the control message comprises a maximum number of repetitions supported by the UE.

Aspect 39: The method of any of aspects 17 to 38, wherein the control message comprises at least one of a physical downlink control channel, a physical sidelink control channel, or a combination thereof.

Aspect 40: A method of wireless communication at a base station, comprising: transmitting, to a user equipment (UE), a configuration message indicating that transmission of a control message is to be repeated via a set of control message repetitions; transmitting, to the UE, an indication that a repetition instance of the set of control message repetitions is designated as a triggering instance for a minimum delay parameter, wherein the minimum delay parameter corresponds to a minimum time delay between the triggering instance and receipt of a data message scheduled by the control message; transmitting, to the UE, the triggering instance during a first transmission time interval; and transmitting, to the UE, the data message during a second transmission time interval that is at least the minimum time delay after receipt of the triggering instance.

Aspect 41: The method of aspect 40, wherein the triggering instance comprises a first repetition of the control message or a last repetition of the control message.

Aspect 42: The method of any of aspects 40 or 41, wherein the triggering instance comprises a repetition of the control message included in a subset of a set of configured repetitions of the control message, wherein the set of configured repetitions of the control message comprises a maximum number of repetitions supported by the UE.

Aspect 43: The method of any of aspects 40 to 42, wherein transmitting the indication further comprises: configuring the UE to calculate the minimum time delay based at least in part on a parameter associated with the repetition instance designated as the triggering instance.

Aspect 44: The method of any of aspects 40 to 43, wherein the parameter associated with the triggering instance comprises at least one of a starting symbol of the control message, an ending symbol of the control message, a duration of the control message, or a combination thereof.

Aspect 45: The method of any of aspects 40 to 44, wherein the starting symbol of the control message corresponds to a start of the first transmission time interval and the ending symbol of the control message corresponds to an end of the first transmission time interval.

Aspect 46: The method of any of aspects 40 to 45, wherein the starting symbol of the control message and the ending symbol of the control message each correspond to specific symbols of the first transmission time interval, wherein the specific symbols are either predetermined or are indicated to the UE by the base station.

Aspect 47: The method of any of aspects 40 to 46, wherein the parameter is constant across a plurality of repetition instances designated as triggering instances.

Aspect 48: The method of any of aspects 40 to 47, further comprising: receiving, from the UE, a capability of the UE to support a plurality of minimum delay parameters; and transmitting, to the UE, an indication of the minimum delay parameter based at least in part on the capability of the UE.

Aspect 49: The method of any of aspects 40 to 48, wherein transmitting the indication that the repetition instance of the set of control message repetitions is designated as the triggering instance further comprises: transmitting, to the UE, the indication of that the repetition instance of the set of control message repetitions is designated as the triggering instance via at least one of a master information block, a system information block, a radio resource control message, a medium access control (MAC) control element, a downlink control information, or a combination thereof.

Aspect 50: The method of any of aspects 40 to 49, wherein a value of the minimum delay parameter is based at least in part on repetition instance designated as the triggering instance.

Aspect 51: The method of any of aspects 40 to 50, wherein the control message comprises at least one of a physical downlink control channel, a physical sidelink control channel, or a combination thereof.

Aspect 52: The method of any of aspects 40 to 51, wherein transmitting the indication of the minimum delay parameter further comprises: transmitting, to the UE, the indication of the minimum delay parameter via a radio resource control message.

Aspect 53: A method of wireless communication at a base station, comprising: transmitting, to a user equipment (UE), a configuration message indicating that transmission of a control message is to be repeated via a set of control message repetitions; transmitting, to the UE, an indication that a repetition instance of the set of control message repetitions is designated as a triggering instance for a delay parameter, wherein the delay parameter corresponds to a time delay between the triggering instance and an operation associated with the control message; transmitting, to the UE, the triggering instance during a first transmission time interval; and performing the operation during a second transmission time interval that is after the first transmission time interval by at least the time delay.

Aspect 54: The method of aspect 53, wherein performing the operation further comprises: transmitting a data message scheduled by the control message during the second transmission time interval that is at least the time delay after receipt of the triggering instance.

Aspect 55: The method of any of aspects 53 or 54, wherein performing the operation further comprises: receiving an uplink data message during the second transmission time interval that is at least the time delay after receipt of the triggering instance.

Aspect 56: The method of any of aspects 53 to 55, wherein performing the operation further comprises: receiving an acknowledgement for the control message during the second transmission time interval that is at least the time delay after receipt of the triggering instance.

Aspect 57: The method of any of aspects 53 to 56, wherein performing the operation further comprises: receiving a random access channel message for the control message during the second transmission time interval that is at least the time delay after receipt of the triggering instance.

Aspect 58: The method of any of aspects 53 to 57, wherein transmitting the indication further comprises: configuring the UE to calculate the time delay based at least in part on a parameter associated with the repetition instance designated as the triggering instance.

Aspect 59: The method of any of aspects 53 to 58, wherein the parameter associated with the triggering instance comprises at least one of a starting symbol of the control message, an ending symbol of the control message, a duration of the control message, or a combination thereof.

Aspect 60: The method of any of aspects 53 to 59, wherein the starting symbol of the control message corresponds to a start of the first transmission time interval and the ending symbol of the control message corresponds to an end of the first transmission time interval.

Aspect 61: The method of any of aspects 53 to 60, wherein the parameter is constant across a plurality of repetition instances designated as triggering instances.

Aspect 62: The method of any of aspects 53 to 61, wherein transmitting the indication that the repetition instance of the set of control message repetitions is designated as the triggering instance further comprises: transmitting, to the UE, the indication of that the repetition instance of the set of control message repetitions is designated as the triggering instance via at least one of a master information block, a system information block, a radio resource control message, a medium access control (MAC) control element, a downlink control information, or a combination thereof.

Aspect 63: The method of any of aspects 53 to 62, wherein the repetition instance is designated as a triggering instance based at least in part on the operation to be performed during the second transmission time interval.

Aspect 64: The method of any of aspects 53 to 63, wherein a value of the delay parameter is based at least in part on repetition instance designated as the triggering instance.

Aspect 65: The method of any of aspects 53 to 64, wherein the triggering instance comprises a first repetition of the control message or a last repetition of the control message.

Aspect 66: The method of any of aspects 53 to 65, wherein the triggering instance comprises a repetition of the control message included in a subset of repetitions of the control message, wherein the subset of repetitions of the control message comprises a maximum number of repetitions supported by the UE.

Aspect 67: The method of any of aspects 53 to 66, wherein the control message comprises at least one of a physical downlink control channel, a physical sidelink control channel, or a combination thereof.

Aspect 68: An apparatus comprising at least one means for performing a method of any of aspects 1 to 16.

Aspect 69: An apparatus comprising at least one means for performing a method of any of aspects 17 to 39.

Aspect 70: An apparatus comprising at least one means for performing a method of any of aspects 40 to 52.

Aspect 71: An apparatus comprising at least one means for performing a method of any of aspects 53 to 67.

Aspect 72: An apparatus for wireless communications comprising a processor; memory coupled with the processor; and instructions stored in the memory and executable by the processor to cause the apparatus to perform a method of any of aspects 1 to 16.

Aspect 73: An apparatus for wireless communications comprising a processor; memory coupled with the processor; and instructions stored in the memory and executable by the processor to cause the apparatus to perform a method of any of aspects 17 to 39.

Aspect 74: An apparatus for wireless communications comprising a processor; memory coupled with the processor; and instructions stored in the memory and executable by the processor to cause the apparatus to perform a method of any of aspects 40 to 52.

Aspect 75: An apparatus for wireless communications comprising a processor; memory coupled with the processor; and instructions stored in the memory and executable by the processor to cause the apparatus to perform a method of any of aspects 53 to 67.

Aspect 76: A non-transitory computer-readable medium storing code for wireless communications, the code comprising instructions executable by a processor to perform a method of any of aspects 1 to 16.

Aspect 77: A non-transitory computer-readable medium storing code for wireless communications, the code comprising instructions executable by a processor to perform a method of any of aspects 17 to 39.

Aspect 78: A non-transitory computer-readable medium storing code for wireless communications, the code comprising instructions executable by a processor to perform a method of any of aspects 40 to 52.

Aspect 79: A non-transitory computer-readable medium storing code for wireless communications, the code comprising instructions executable by a processor to perform a method of any of aspects 53 to 67.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a configuration message indicating that transmission of a control message is to be repeated via a set of control message repetitions;
receiving a downlink indication that indicates that a repetition instance of the set of control message repetitions is designated as a triggering instance for a minimum delay parameter, wherein the minimum delay parameter is associated with each control message repetition of the set of control message repetitions and corresponds to a minimum time delay between the triggering instance and receipt of a data message scheduled by the control message;
receiving the triggering instance during a first transmission time interval; and
monitoring for the data message during a second transmission time interval that is at least the minimum time delay after receipt of the triggering instance.

2. The method of claim 1, wherein the triggering instance comprises a first repetition of the control message or a last repetition of the control message.

3. The method of claim 1, wherein the triggering instance comprises a repetition of the control message included in a subset of a set of configured repetitions of the control message, wherein the set of configured repetitions of the control message comprises a maximum number of repetitions supported by the UE.

4. The method of claim 1, further comprising:
receiving the minimum delay parameter associated with the triggering instance; and
calculating the minimum time delay based at least in part on the minimum delay parameter associated with the triggering instance.

5. The method of claim 4, wherein the minimum delay parameter associated with the triggering instance comprises at least one of a starting symbol of the control message, an ending symbol of the control message, a duration of the control message, or a combination thereof.

6. The method of claim 5, wherein the starting symbol of the control message corresponds to a start of the first transmission time interval and the ending symbol of the control message corresponds to an end of the first transmission time interval.

7. The method of claim 5, wherein the starting symbol of the control message and the ending symbol of the control message each correspond to specific symbols of the first transmission time interval, wherein the specific symbols are either predetermined or are indicated to the UE by a network entity.

8. The method of claim 4, wherein the minimum delay parameter is constant across a plurality of repetition instances designated as triggering instances.

9. The method of claim 1, further comprising:
receiving an indication to drop a repetition instance;
determining that the repetition instance to be dropped corresponds to the repetition instance designated as the triggering instance; and
dropping the repetition instance based at least in part on receiving the indication.

10. The method of claim 9, further comprising:
designating a subsequent repetition instance as the triggering instance based at least in part on dropping the repetition instance.

11. The method of claim 1, further comprising:
initiating a sleep mode after receiving the triggering instance of the control message; and
terminating the sleep mode upon expiration of the minimum time delay between the first transmission time interval and the second transmission time interval.

12. The method of claim 1, further comprising:
transmitting, to a network entity, a capability of the UE to support a plurality of minimum delay parameters; and
receiving, from the network entity, an indication of the minimum delay parameter based at least in part on the capability of the UE.

13. The method of claim 12, wherein receiving the indication of the minimum delay parameter further comprises:
receiving, from the network entity, the indication of the minimum delay parameter via a radio resource control message.

14. The method of claim 1, wherein identifying that the repetition instance of the set of control message repetitions is designated as the triggering instance further comprises:
receiving, from a network entity, an indication of that the repetition instance of the set of control message repetitions is designated as the triggering instance via at least one of a master information block, a system information block, a radio resource control message, a medium access control (MAC) control element, a downlink control information, or a combination thereof.

15. The method of claim 1, wherein a value of the minimum delay parameter is based at least in part on the repetition instance designated as the triggering instance.

16. The method of claim 1, wherein the control message comprises at least one of a physical downlink control channel, a physical sidelink control channel, or a combination thereof.

17. A user equipment (UE) comprising:
one or more memories storing processor-executable code; and
one or more processors coupled with the one or more memories and individually or collectively operable to execute the code to cause the UE to:
receive, from a network entity, a configuration message indicating that transmission of a control message is to be repeated via a set of control message repetitions;
receive a downlink indication that indicates that a repetition instance of the set of control message repetitions is designated as a triggering instance for a minimum delay parameter, wherein the minimum delay parameter is associated with each control message repetition of the set of control message repetitions and corresponds to a minimum time delay between the triggering instance and receipt of a data message scheduled by the control message;
receive, from the network entity, the triggering instance during a first transmission time interval; and
monitor for the data message during a second transmission time interval that is at least the minimum time delay after receipt of the triggering instance.

18. The UE of claim 17, wherein the triggering instance comprises a first repetition of the control message or a last repetition of the control message.

19. The UE of claim 17, wherein the triggering instance comprises a repetition of the control message included in a subset of a set of configured repetitions of the control message, wherein the set of configured repetitions of the control message comprises a maximum number of repetitions supported by the UE.

20. The UE of claim 17, wherein the one or more processors are individually or collectively further operable to execute the code to cause the UE to:
receive the minimum delay parameter associated with the triggering instance; and calculate the minimum time delay based at least in part on the minimum delay parameter associated with the triggering instance.

21. The UE of claim 20, wherein the minimum delay parameter associated with the triggering instance comprises at least one of a starting symbol of the control message, an ending symbol of the control message, a duration of the control message, or a combination thereof.

22. The UE of claim 21, wherein the starting symbol of the control message corresponds to a start of the first transmission time interval and the ending symbol of the control message corresponds to an end of the first transmission time interval.

23. The UE of claim 21, wherein:
the starting symbol of the control message and the ending symbol of the control message each correspond to specific symbols of the first transmission time interval, and
the specific symbols are either predetermined or are indicated to the UE by the network entity.

24. The UE of claim 20, wherein the minimum delay parameter is constant across a plurality of repetition instances designated as triggering instances.

25. The UE of claim 17, wherein the one or more processors are individually or collectively further operable to execute the code to cause the UE to:
receive an indication to drop a repetition instance;
determine that the repetition instance to be dropped corresponds to the repetition instance designated as the triggering instance; and
drop the repetition instance based at least in part on receiving the indication.

26. The UE of claim 25, wherein the one or more processors are individually or collectively further operable to execute the code to cause the UE to:
designate a subsequent repetition instance as the triggering instance based at least in part on dropping the repetition instance.

27. The UE of claim 17, wherein the one or more processors are individually or collectively further operable to execute the code to cause the UE to:
initiate a sleep mode after receiving the triggering instance of the control message; and
terminate the sleep mode upon expiration of the minimum time delay between the first transmission time interval and the second transmission time interval.

28. The UE of claim 17, wherein the one or more processors are individually or collectively further operable to execute the code to cause the UE to:
transmit, to the network entity, a capability of the UE to support a plurality of minimum delay parameters; and
receive, from the network entity, an indication of the minimum delay parameter based at least in part on the capability of the UE.

29. A user equipment (UE) for wireless communication, comprising:
means for receiving a configuration message indicating that transmission of a control message is to be repeated via a set of control message repetitions;
means for receiving a downlink indication that indicates that a repetition instance of the set of control message repetitions is designated as a triggering instance for a minimum delay parameter, wherein the minimum delay parameter is associated with each control message repetition of the set of control message repetitions and corresponds to a minimum time delay between the triggering instance and receipt of a data message scheduled by the control message;
means for receiving the triggering instance during a first transmission time interval; and
means for monitoring for the data message during a second transmission time interval that is at least the minimum time delay after receipt of the triggering instance.

30. A non-transitory computer-readable medium storing code for wireless communication, the code comprising instructions executable by one or more processors to:
receive a configuration message indicating that transmission of a control message is to be repeated via a set of control message repetitions;
receive a downlink indication that indicates that a repetition instance of the set of control message repetitions is designated as a triggering instance for a minimum delay parameter, wherein the minimum delay parameter is associated with each control message repetition of the set of control message repetitions and corresponds to a minimum time delay between the triggering instance and receipt of a data message scheduled by the control message;
receive the triggering instance during a first transmission time interval; and
monitor for the data message during a second transmission time interval that is at least the minimum time delay after receipt of the triggering instance.

* * * * *